United States Patent
Dalla Libera et al.

(10) Patent No.: US 11,231,722 B2
(45) Date of Patent: Jan. 25, 2022

(54) MOBILE BODY SYSTEM AND CONTROL METHOD

(71) Applicant: Panasonic Intellectual Property Management Co., Ltd., Osaka (JP)

(72) Inventors: Fabio Dalla Libera, Osaka (JP); Yuko Tsusaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 219 days.

(21) Appl. No.: 16/688,171

(22) Filed: Nov. 19, 2019

(65) Prior Publication Data
US 2020/0209884 A1   Jul. 2, 2020

(30) Foreign Application Priority Data

Dec. 28, 2018 (JP) .............................. JP2018-248454

(51) Int. Cl.
  *G05D 1/02* (2020.01)

(52) U.S. Cl.
  CPC ......... *G05D 1/0274* (2013.01); *G05D 1/0272* (2013.01); *G05D 2201/0203* (2013.01)

(58) Field of Classification Search
  CPC .............. G05D 1/0274; G05D 1/0272; G05D 2201/0203; G05D 1/0287; G05D 1/0238; G05D 2201/0215; G05D 1/0236; G05D 1/024; G05D 1/0242; G05D 1/0251; G05D 1/0255; G05D 1/0257; G05D 1/0214; G05D 1/0221; G05D 1/0276
  See application file for complete search history.

(56) References Cited

U.S. PATENT DOCUMENTS

| | | | |
|---|---|---|---|
| 2008/0055103 A1* | 3/2008 | Koide | ................... B66C 15/045 340/686.6 |
| 2010/0130230 A1 | 5/2010 | Aggarwal et al. | |
| 2012/0106829 A1 | 5/2012 | Lee et al. | |
| 2017/0100007 A1 | 4/2017 | Matsumoto et al. | |
| 2017/0285640 A1 | 10/2017 | Harada | |
| 2018/0164806 A1* | 6/2018 | Pulling | .............. G06Q 30/0601 |

FOREIGN PATENT DOCUMENTS

| | | |
|---|---|---|
| JP | 2011-211336 | 10/2011 |
| JP | 2012-509484 | 4/2012 |
| JP | 2012-96028 | 5/2012 |
| JP | 2017-188066 | 10/2017 |
| WO | 2010/059940 | 5/2010 |
| WO | 2016/002186 | 1/2016 |

* cited by examiner

*Primary Examiner* — Donald J Wallace
(74) *Attorney, Agent, or Firm* — Wenderoth, Lind & Ponack, L.L.P.

(57) ABSTRACT

Provided is a mobile body system capable of moving in a more appropriate travel path. In the mobile body system, upon movement of the first to third mobile bodies from the first area into the second area, (a) the third mobile body moves into a boundary area and temporarily stops using the distance to the first mobile body and the distance to the second mobile body, (b) after the third mobile body moves into the boundary area, the first mobile body moves into the boundary area and temporarily stops using the distance to the second mobile body and the distance to the third mobile body, and (c) after the third mobile body moves into the boundary area, the second mobile body moves into the boundary area and temporarily stops using the distance to the first mobile body and the distance to the third mobile body.

9 Claims, 27 Drawing Sheets

MOBILE BODY SYSTEM AND CONTROL METHOD

CROSS REFERENCE TO RELATED APPLICATION

This application claims the benefit of priority of Japanese Patent Application Number 2018-248454 filed on Dec. 28, 2018, the entire content of which is hereby incorporated by reference.

BACKGROUND

1. Technical Field

The present disclosure relates to mobile body systems and control methods.

2. Description of the Related Art

An autonomous travel-type vacuum cleaner that autonomously travels on a cleaning surface and sucks up dirt present on the cleaning surface has been disclosed (refer to Internal Publication No. WO 2016/002186).

SUMMARY

However, mobile robots represented by the conventional autonomous travel-type vacuum cleaner have room for improvement on settings of a travel path.

Thus, the present disclosure provides a mobile body system in which a mobile body is capable of moving in a more appropriate travel path.

A mobile body system according to one aspect of the present disclosure includes at least three mobile bodies which move in a space, each of which includes: a storage in which map information of the space is stored, the space including a first area, a second area, and a boundary area in which the first area and the second area overlap; a distance measuring sensor; a mobile portion which moves the mobile body; and a controller which controls movement of the mobile body by the mobile portion, using the map information stored in the storage and a position of the mobile body estimated based on distance information obtained by the distance measuring sensor. The at least three mobile bodies include a first mobile body, a second mobile body, and a third mobile body. (i) Upon movement of the at least three mobile bodies in the first area, each of the first mobile body and the second mobile body temporarily stops at a position within a first distance over which distance measurement by the distance measuring sensor is possible from an arbitrary position in the first area, and the third mobile body moves using a position of the third mobile body estimated based on a distance between the third mobile body and the first mobile body and a distance between the third mobile body and the second mobile body which are measured by the distance measuring sensor that is included in the third mobile body. (ii) Upon movement of the at least three mobile bodies from the first area into the second area, (a) the third mobile body moves into the boundary area and temporarily stops using the distance between the third mobile body and the first mobile body and the distance between the third mobile body and the second mobile body, (b) after the third mobile body moves into the boundary area, the first mobile body moves into the boundary area and temporarily stops using a distance between the first mobile body and the second mobile body and the distance between the first mobile body and the third mobile body, and (c) after the third mobile body moves into the boundary area, the second mobile body moves into the boundary area and temporarily stops using the distance between the second mobile body and the first mobile body and the distance between the second mobile body and the third mobile body.

Note that the aforementioned general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

With the mobile body system according to the present disclosure, a mobile body is capable of moving in a more appropriate travel path.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
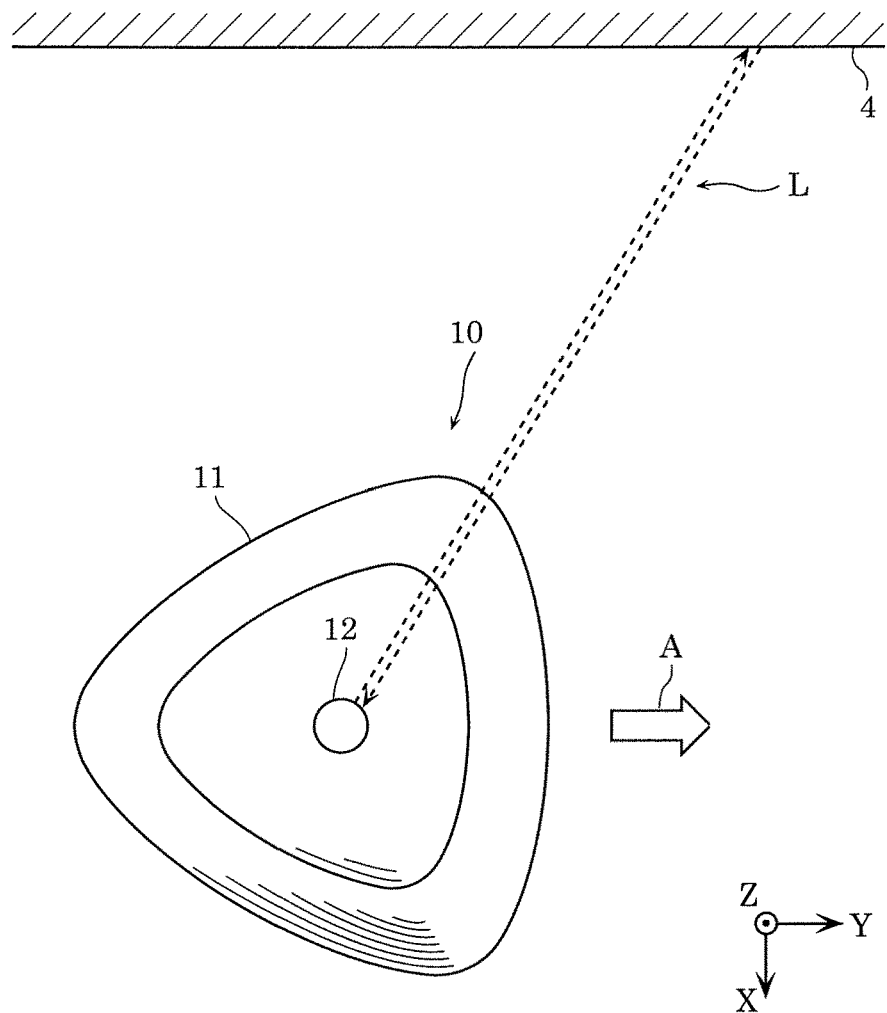
FIG. 1 is a top view schematically illustrating the external appearance of a mobile body according to an embodiment.

A mobile body system according to one aspect of the present disclosure includes at least three mobile bodies which move in a space, each of which includes: a storage in which map information of the space is stored, the space including a first area, a second area, and a boundary area in which the first area and the second area overlap; a distance measuring sensor; a mobile portion which moves the mobile body; and a controller which controls movement of the mobile body by the mobile portion, using the map information stored in the storage and a position of the mobile body estimated based on distance information obtained by the distance measuring sensor. The at least three mobile bodies include a first mobile body, a second mobile body, and a third mobile body. (i) Upon movement of the at least three mobile bodies in the first area, each of the first mobile body and the second mobile body temporarily stops at a position within a first distance over which distance measurement by the distance measuring sensor is possible from an arbitrary position in the first area, and the third mobile body moves using a position of the third mobile body estimated based on a distance between the third mobile body and the first mobile body and a distance between the third mobile body and the second mobile body which are measured by the distance measuring sensor that is included in the third mobile body. (ii) Upon movement of the at least three mobile bodies from the first area into the second area, (a) the third mobile body moves into the boundary area and temporarily stops using the distance between the third mobile body and the first mobile body and the distance between the third mobile body and the second mobile body, (b) after the third mobile body moves into the boundary area, the first mobile body moves into the boundary area and temporarily stops using a distance between the first mobile body and the second mobile body and the distance between the first mobile body and the third mobile body, and (c) after the third mobile body moves into the boundary area, the second mobile body moves into the boundary area and temporarily stops using the distance between the second mobile body and the first mobile body and the distance between the second mobile body and the third mobile body.

For example, (iii) upon movement of the at least three mobile bodies in the second area after the movement from the first area into the second area, each of the first mobile body and the second mobile body may move to a position within the first distance from an arbitrary position in the second area and temporarily stop, and the third mobile body may move using a position of the third mobile body estimated based on the distance between the third mobile body and the first mobile body and the distance between the third mobile body and the second mobile body which are measured by the distance measuring sensor that is included in the third mobile body.

For example, (iii) upon movement of the at least three mobile bodies in the second area after the movement from the first area into the second area, each of the second mobile body and the third mobile body may move to a position within the first distance from an arbitrary position in the second area and temporarily stop, and the first mobile body may move using a position of the first mobile body estimated based on the distance between the first mobile body and the second mobile body and the distance between the first mobile body and the third mobile body which are measured by the distance measuring sensor that is included in the first mobile body.

For example, the space may include a plurality of areas including the first area and the second area. Each of the plurality of areas may be in the shape of a parallelogram. Among four vertices of the parallelogram, two opposite vertices may be two intersections of two circles centered on two points within the first distance from an arbitrary position in the area. The parallelogram may be inscribed in an overlap region of the two circles.

For example, in each of the plurality of areas, two points within the first distance from an arbitrary position in the area may be on a side that is an edge of the area.

For example, the second area may be a region including a carpet disposed on a fixed surface, and the first area may be the fixed surface on which the carpet is not located. The second mobile body and the third mobile body may be positioned to press the carpet against the fixed surface.

For example, the first mobile body may move in the second area so as to pass over a straight line connecting the second mobile body and the third mobile body.

Furthermore, a mobile body system according to one aspect of the present disclosure includes at least four mobile bodies which move in a space, each of which includes: a storage in which map information of the space is stored, the space including a first area, a second area, and a boundary area in which the first area and the second area overlap; a distance measuring sensor; a mobile portion which moves the mobile body; and a controller which controls movement of the mobile body by the mobile portion, using the map information stored in the storage and a position of the mobile body estimated based on distance information obtained by the distance measuring sensor. The at least four mobile bodies include a first mobile body, a second mobile body, a third mobile body, and a fourth mobile body. (i) Upon movement of the at least four mobile bodies in the first area, each of the first mobile body, the second mobile body, and the third mobile body temporarily stops at a position within a first distance over which distance measurement by the distance measuring sensor is possible from an arbitrary position in the first area, and the fourth mobile body moves using a position of the fourth mobile body estimated based on a distance between the fourth mobile body and the first mobile body, a distance between the fourth mobile body and the second mobile body, and a distance between the fourth mobile body and the third mobile body which are measured by the distance measuring sensor that is included in the fourth mobile body. (ii) Upon movement of the at least four mobile bodies from the first area into the second area, (a) the fourth mobile body moves into the boundary area and temporarily stops using the distance between the fourth mobile body and the first mobile body, the distance between the fourth mobile body and the second mobile body, and a distance between the fourth mobile body and the third mobile body, (b) after the fourth mobile body moves into the boundary area, the first mobile body moves into the boundary area and temporarily stops using a distance between the first mobile body and the second mobile body, a distance between the first mobile body and the third mobile body, and the distance between the first mobile body and the fourth mobile body, (c) after the fourth mobile body moves into the boundary area, the second mobile body moves into the boundary area and temporarily stops using the distance between the second mobile body and the first mobile body, a distance between the second mobile body and the third mobile body, and the distance between the second mobile body and the fourth mobile body, and (d) after the fourth mobile body moves into the boundary area, the third mobile body moves into the boundary area and temporarily stops using the distance between the third mobile body and the first mobile body, the distance between the third mobile body and the second mobile body, and the distance between the third mobile body and the fourth mobile body.

A method for controlling a mobile body according to one aspect of the present disclosure is a method for controlling a mobile body system including at least three mobile bodies which move in a space and each of which includes: a storage in which map information of the space is stored, the space including a first area, a second area, and a boundary area in which the first area and the second area overlap; a distance measuring sensor; a mobile portion which moves the mobile body; and a controller which controls movement of the mobile body by the mobile portion, using the map information stored in the storage and a position of the mobile body estimated based on distance information obtained by the distance measuring sensor. The at least three mobile bodies include a first mobile body, a second mobile body, and a third mobile body. The method includes: (i) upon movement of the at least three mobile bodies in the first area, causing each of the first mobile body and the second mobile body to temporarily stop at a position within a first distance over which distance measurement by the distance measuring sensor is possible from an arbitrary position in the first area, and causing the third mobile body to move using a position of the third mobile body estimated based on a distance between the third mobile body and the first mobile body and a distance between the third mobile body and the second mobile body which are measured by the distance measuring sensor that is included in the third mobile body; and (ii) upon movement of the at least three mobile bodies from the first area into the second area, (a) causing the third mobile body to move into the boundary area and temporarily stop using the distance between the third mobile body and the first mobile body and the distance between the third mobile body and the second mobile body, (b) after the third mobile body moves into the boundary area, causing the first mobile body to move into the boundary area and temporarily stop using a distance between the first mobile body and the second mobile body and the distance between the first mobile body and the third mobile body, and (c) after the third mobile body moves into the boundary area, causing the second mobile body to move into the boundary area and temporarily stop using the distance between the second mobile body and the first mobile body and the distance between the second mobile body and the third mobile body.

Furthermore, a mobile body system according to one aspect of the present disclosure includes at least three mobile bodies each of which is capable of moving along a surface and includes: a storage in which map information indicating a position of a first area on the surface and a position of a second area at least partially overlapping the first area is stored; a distance measuring sensor; a mobile portion which moves the mobile body; and a controller which controls movement of the mobile portion by the mobile portion, using the map information stored in the storage and a position of the mobile body estimated based on distance information obtained by the distance measuring sensor. The at least three mobile bodies are located in the first area. Two mobile bodies among the at least three mobile bodies function as reference mobile bodies each of which is temporarily not in motion, under control of the controller, in a position within a first distance over which distance measurement by the distance measuring sensor is possible from an arbitrary position in the first area. A mobile body different from the two mobile bodies among the at least three mobile bodies functions as a steerable mobile body which moves in the first area under control of the controller using a position of the mobile body estimated based on a distance between the mobile body and each of the reference mobile bodies which is measured by the distance measuring sensor that is included in the mobile body. Upon movement of the at least three mobile bodies from the first area into the second area, (a) the steerable mobile body moves into a boundary area between the first area and the second area and temporarily stops under control of the controller according to measurement of distances to the two reference mobile bodies, (b) the reference mobile bodies sequentially move into the boundary area and temporarily stop under control of the controller using the two reference mobile bodies or the steerable mobile body that is temporarily not in motion, (c) two mobile bodies among the at least three mobile bodies move to positions within the first distance from an arbitrary position in the second area and temporarily stop under control of the controller to function as new reference mobile bodies, and (d) a mobile body different from the new reference mobile bodies among the at least three mobile bodies serves as a new steerable mobile body which moves in the second area under control of the controller using a position of the mobile body estimated based on a distance between the mobile body and each of the new reference mobile bodies which is measured by the distance measuring sensor that is included in the mobile body.

According to the above aspect, the mobile body system estimates the position of this mobile body system itself using the reference mobile bodies in the case where estimation of the position of this mobile body system itself is not possible for a reason such as absence of an object such as a wall around the steerable mobile body when the mobile body system moves along a surface. In the case where the mobile body system moves from the first area into the second area, three mobile bodies move into the boundary area once and then move into the second area, making it possible to avoid a failure in estimating the position of this mobile body system itself using the steerable mobile body. This allows the steerable mobile body to move from the first area into the second area while continuously estimating the position of this steerable mobile body itself, and repeating this operation results in passing through a plurality of areas. In this manner, the mobile body can move in a more appropriate travel path. Here, the reference mobile bodies correspond to the first mobile body and the second mobile body, and the steerable mobile body corresponds to the third mobile body.

For example, the new steerable mobile body may be different from the steerable mobile body.

According to the above aspect, it is possible to replace the mobile body functioning as the steerable mobile body in the mobile body system. This produces an advantageous effect of leveling out electric power consumption of the plurality of mobile bodies, leading to an advantageous effect of enabling the mobile body system to operate for a longer length of time as a whole.

For example, each of the plurality of areas may be in the shape of a parallelogram, and among four vertices of the parallelogram, two opposite vertices may be two intersections of two circles centered on two points within the first distance from an arbitrary position in the area, and the parallelogram may be inscribed in an overlap region of the two circles.

According to the above aspect, by using an area in the shape of a parallelogram, it is possible to more easily set a plurality of areas in a region in which the mobile body is capable of moving.

For example, in each of the plurality of areas, two points within the first distance from an arbitrary position in the area may be on a side that is an edge of the area.

According to the above aspect, during movement of the steerable mobile body in the mobile body system, it is possible to keep the presence of the reference mobile bodies from becoming restriction or impedance to the movement of the steerable mobile body.

For example, in each of the plurality of areas, two points within the first distance from an arbitrary position in the area may be on a side that is an edge of the area.

According to the above aspect, in the mobile body system, it is possible to avoid the occurrence of a fault in execution of the task by the steerable mobile body that is due to, for example, displacement of a carpet along with movement of the steerable mobile body.

Furthermore, a mobile body system according to one aspect of the present disclosure includes at least four mobile bodies each of which is capable of moving in a space and includes: a storage in which map information indicating a position of a first area in the space and a position of a second area at least partially overlapping the first area is stored; a distance measuring sensor; a mobile portion which moves the mobile body; and a controller which controls movement of the mobile portion by the mobile portion, using the map information stored in the storage and a position of the mobile body estimated based on distance information obtained by the distance measuring sensor. The at least four mobile bodies are located in the first area. Three mobile bodies among the at least four mobile bodies function as reference mobile bodies each of which is temporarily not in motion, under control of the controller, in a position within a first distance over which distance measurement by the distance measuring sensor is possible from an arbitrary position in the first area. A mobile body different from the three mobile bodies among the at least four mobile bodies functions as a steerable mobile body which moves in the first area under control of the controller using a position of the mobile body estimated based on a distance between the mobile body and each of the reference mobile bodies which is measured by the distance measuring sensor that is included in the mobile body. Upon movement of the at least four mobile bodies from the first area into the second area, (a) the steerable mobile body moves into a boundary area between the first area and the second area and temporarily stops under control of the controller according to measurement of distances to the three reference mobile bodies, (b) the reference mobile bodies sequentially move into the boundary area and temporarily stop under control of the controller using the three reference mobile bodies or the steerable mobile body that is temporarily not in motion, (c) three mobile bodies among the at least four mobile bodies move to positions within the first distance from an arbitrary position in the second area and temporarily stop under control of the controller to function as new reference mobile bodies, and (d) a mobile body different from the new reference mobile bodies among the at least four mobile bodies serves as a new steerable mobile body which moves in the second area under control of the controller using a position of the mobile body estimated based on a distance between the mobile body and each of the new reference mobile bodies which is measured by the distance measuring sensor that is included in the mobile body.

According to the above aspect, the mobile body system estimates the position of this mobile body system itself using the reference mobile bodies in the case where estimation of the position of this mobile body system itself is not possible for a reason such as absence of an object such as a wall around the steerable mobile body when the mobile body system moves in a space. In the case where the mobile body system moves from the first area into the second area, four mobile bodies move into the boundary area once and then move into the second area, making it possible to avoid a failure in estimating the position of this mobile body system itself using the steerable mobile body. This allows the steerable mobile body to move from the first area into the second area while continuously estimating the position of this steerable mobile body itself, and repeating this operation results in passing through a plurality of areas. In this manner, the mobile body can move in a more appropriate travel path.

Furthermore, a control method according to one aspect of the present disclosure is a method for controlling a mobile body system including at least three mobile bodies each of which is capable of moving along a surface and includes: a storage in which map information indicating a position of a first area on the surface and a position of a second area at least partially overlapping the first area is stored; a distance measuring sensor; a mobile portion which moves the mobile body; and a controller which controls movement of the mobile portion by the mobile portion, using the map information stored in the storage and a position of the mobile body estimated based on distance information obtained by the distance measuring sensor. The at least three mobile bodies are located in the first area. Two mobile bodies among the at least three mobile bodies function as reference mobile bodies each of which is temporarily not in motion, under control of the controller, in a position within a first distance over which distance measurement by the distance measuring sensor is possible from an arbitrary position in the first area. A mobile body different from the two mobile bodies among the at least three mobile bodies functions as a steerable mobile body which moves in the first area under control of the controller using a position of the mobile body estimated based on a distance between the mobile body and each of the reference mobile bodies which is measured by the distance measuring sensor that is included in the mobile body. Upon movement of the at least three mobile bodies from the first area into the second area, (a) the steerable mobile body moves into a boundary area between the first area and the second area and temporarily stops under control of the controller according to measurement of distances to the two reference mobile bodies, (b) the reference mobile bodies sequentially move into the boundary area and temporarily stop under control of the controller using the two reference mobile bodies or the steerable mobile body that is temporarily not in motion, (c) two mobile bodies among the at least three mobile bodies move to positions within the first distance from an arbitrary position in the second area and temporarily stop under control of the controller to function as new reference mobile bodies, and (d) a mobile body different from the new reference mobile bodies among the at least three mobile bodies serves as a new steerable mobile body which moves in the second area under control of the controller using a position of the mobile body estimated based on a distance between the mobile body and each of the new reference mobile bodies which is measured by the distance measuring sensor that is included in the mobile body.

According to the above aspect, substantially the same advantageous effects achieved with the above-described mobile body system are achieved.

Note that the aforementioned general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Hereinafter, an embodiment will be specifically described with reference to the drawings.

EMBODIMENT

In the present embodiment, mobile body system 1 in which a mobile body is capable of moving in a more appropriate travel path will be described. Mobile body system 1 includes at least three mobile bodies 10 each of which performs a predetermined task. One example of mobile body 10 is a vacuum cleaner capable of moving along a surface; in this case, the task is cleaning.

Note that mobile body 10 and the task thereof include a mobile robot that performs various sensing operations, a transfer robot which carries an article, and a communication robot which communicates with a person, in addition to a vacuum cleaner which does the cleaning.

Figure 2:
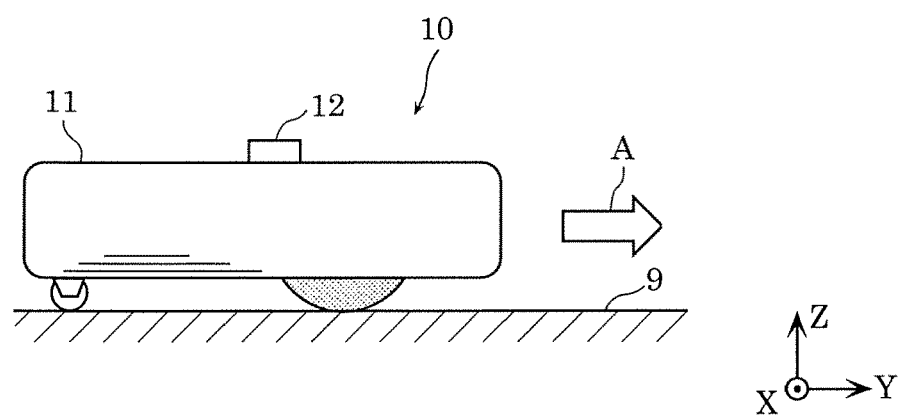
FIG. 2 is a side view schematically illustrating the external appearance of a mobile body according to an embodiment.

FIG. 1 and FIG. 2 are a top view and a side view, respectively, which schematically illustrate the external appearance of a vacuum cleaner serving as mobile body 10 according to the present embodiment. With reference to these figures, operations of mobile body 10 will be described. Note that in the following description, there are cases where description is made using XYZ coordinate axes indicated in the drawings. The positive direction of the Z-axis will also be referred to as upward.

Mobile body 10 autonomously travels on surface 9 to clean surface 9 in an environment. Mobile body 10 autonomously determines a travel path thereof and sucks up dirt, etc., present on surface 9 while moving along the determined travel path. One example of the environment is an indoor space including a house, an office building, and a commercial building. Environments in which the task is performed may be collectively denoted as a space. Mobile body 10 is capable of using own position estimation and mapping through the simultaneous location and mapping (SLAM) upon determining a travel path.

For example, mobile body 10 measures the distance between mobile body 10 and a nearby object such as wall 4 using light L, estimates the position of said mobile body on the map by comparing the distance with that on the map, and creates a new portion of the map. Furthermore, control for moving along a travel path that has been held is performed on the basis of the estimated position of said mobile body. Mobile body 10 moves, as a general rule, in the direction denoted as arrow A. Note that the wording "move" may be expressed as "run" or "travel". Furthermore, the direction denoted by arrow A may be expressed as a direction of movement, a running direction, or a direction of travel.

However, there are cases where mobile body 10 fails to appropriately estimate the position thereof. For example, when a nearby object such as wall 4 illustrated in FIG. 1 is not present around mobile body 10 or when objects present around mobile body 10 do not appropriately reflect light L, no reflected light from the light path indicated in FIG. 1 as light L is obtained, resulting in mobile body 10 failing to appropriately estimate the position thereof.

With mobile body system 1 according to the present embodiment, even when said mobile body fails to appropriately estimate the position thereof as mentioned above, it is possible to appropriately estimate the position by way of light transmission and reception by a plurality of mobile bodies.

The following describes detailed configuration and processes in mobile body 10.

Figure 3:
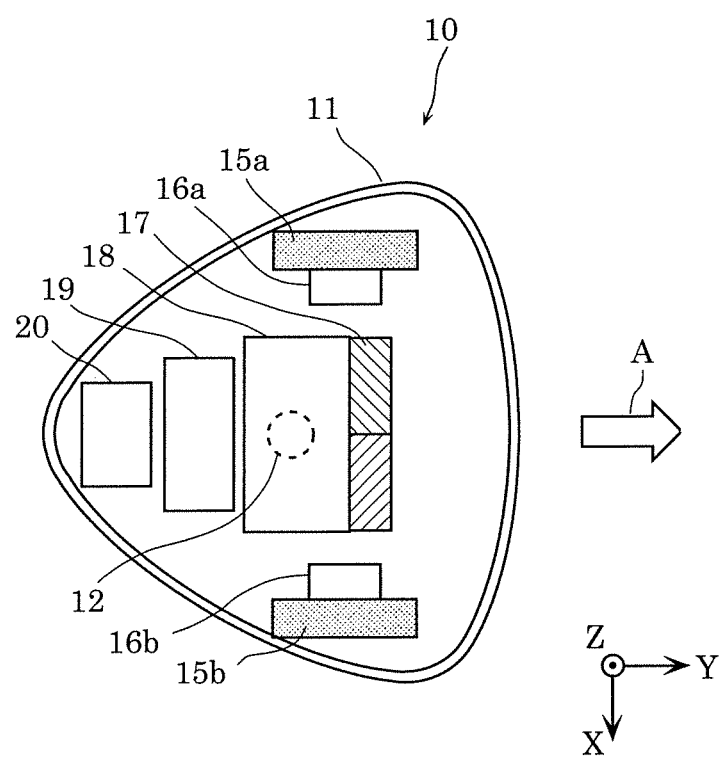
FIG. 3 is a top view schematically illustrating the inner structure of a mobile body according to an embodiment.

FIG. 3 is a top view schematically illustrating the inner structure of a vacuum cleaner which exemplifies mobile body 10 according to the present embodiment.

As illustrated in FIG. 3, mobile body 10 includes housing 11, distance measuring sensor 12, wheels 15a, 15b, motor 16a, 16b, suction portion 17, dust bin 18, control circuit 19, and power supply 20.

Housing 11 is the casing of mobile body 10 and defines the outlie of mobile body 10. Housing 11 is substantially triangular in top view, but may have any shape; for example, housing 11 may be circular, quadrangular, or pentagonal in top view. The size of housing 11 is, for example, approximately 30 cm along each of the X-axis and the Y-axis and approximately 10 cm along the Z-axis, but is not limited thereto.

Distance measuring sensor 12 measures the distance between distance measuring sensor 12 and an object present around mobile body 10. Distance measuring sensor 12 can be implemented using a laser range finder or a light detection and ranging (LiDAR) device which measures the distance between distance measuring sensor 12 and a nearby object by means of light, for example. Note that the case where distance measuring sensor 12 is implemented using a laser range finder or LiDAR is described hereinbelow as an example; however, distance measuring sensor 12 is not limited thereto and may be an ultrasonic sensor, an infrared sensor, or a radio wave sensor.

Distance measuring sensor 12 is disposed exposed from the top or side surface of housing 11. Distance measuring sensor 12 includes a light emitter and a light receiver. The light emitter emits a beam of light in a direction parallel to the XY plane, and the light receiver receives the beam of light emitted from the light emitter. The light emitter emits a beam of light while turning around an axis extending parallel to the Z-axis, and the light receiver receives the beams of light while turning around an axis extending parallel to the Z-axis; in this manner, the distance to an object present around mobile body 10 is measured. The speed of turning is, for example, five rotations per second. The rate of light emission from distance measuring sensor 12 is, for example, 360 times in one rotation. Distance measuring sensor 12 has a predetermined measurement distance. For example, the maximum value of the predetermined measurement distance is referred to as a first distance. The first distance depends on the performance of the laser range finder or the LiDAR. One example of the first distance is between several dozen meters and several hundred meters, inclusive.

Wheels 15a,15b allow mobile body 10 to move. Each of wheels 15a, 15b has a rotating shaft fixed to housing 11; thus, rotation of wheels 15a, 15b results in movement of housing 11. Rotation of wheel 15a and rotation of wheel 15b are independently controlled using motor 16a and motor 16b, respectively. The material of wheels 15a, 15b is rubber, nylon, or the like. Note that wheels 15a, 15b are also referred to simply as wheel(s) 15.

Motor 16a and motor 16b independently control rotation of wheel 15a and rotation of wheel 15b, respectively. Motor 16a rotates or stops wheel 15a under control of control circuit 19. Motor 16b rotates or stops wheel 15b under control of control circuit 19. Furthermore, it is also possible to change the orientation of mobile body 10, in other words, cause a change in direction of mobile body 10, by making a distinction between the rotational speed of motor 16a and the rotational speed of motor 16b. Note that motors 16a, 16b are also referred to simply motor(s) 16.

Suction portion 17 sucks up dirt on surface 9. Suction portion 17 draws the dirt together with air through a suction port (not illustrated in the drawings) disposed in the bottom surface of housing 11. Furthermore, suction portion 17 ejects the drawn dirt into dust bin 18. The width of suction portion 17, in other words, the length of suction portion 17 along the X-axis, is, for example, approximately 15 cm, but is not limited thereto. The suction operation of suction portion 17 is controlled by control circuit 19.

Dust bin 18 is a storage space where the dirt which suction portion 17 has sucked up together with air is stored after filtering with a filter.

Control circuit 19 controls various functions of mobile body 10. Specifically, control circuit 19 determines a travel path of mobile body 10 and controls motors 16a, 16b so that mobile body 10 moves along the determined travel path. Control circuit 19 includes a processor and a memory and can implement the functions as a result of the processor executing a program using the memory.

Upon execution of a cleaning task, control circuit 19 obtains, using distance measuring sensor 12, the distance between distance measuring sensor 12 and an object present around mobile body 10, and determines the travel path of mobile body 10 according to the SLAM. Subsequently, control circuit 19 controls motors 16a, 16b so that suction portion 17 sucks up dirt while mobile body 10 moves along the determined travel path.

Power supply 20 is a power supply device that supplies electricity to each structural element of mobile body 10. Power supply 20 is, for example, a secondary battery, and more specifically is a lithium-ion battery.

Next, the functions and processes in control circuit 19 will be described in further detail.

Figure 4:
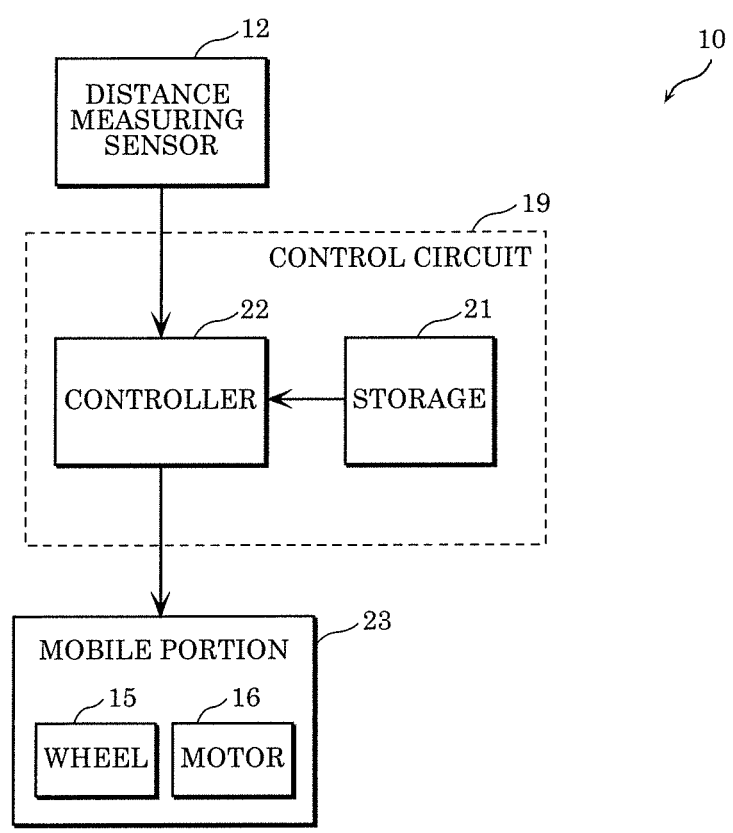
FIG. 4 is a block diagram illustrating the details of the functional configuration of a control circuit of a mobile body according to an embodiment.

FIG. 4 is a block diagram illustrating the functions of control circuit 19 of mobile body 10 according to the present embodiment.

As illustrated in FIG. 4, control circuit 19 includes storage 21 and controller 22. Mobile portion 23 which is a mechanism for moving mobile body 10 is illustrated in FIG. 4. Mobile portion 23 corresponds to at least wheel 15 and motor 16.

Storage 21 stores map information indicating a space to which mobile body 10 can move. In the case where mobile body 10 is a vacuum cleaner that cleans surface 9, the space to which mobile body 10 can move is on surface 9, and the position of mobile body 10 can be repressed in a two-dimensional coordinate system (X, Y). Note that the map information is also referred to simply as a map. The map information includes information indicating the position of each of a plurality of areas (to be described later) set in the aforementioned space.

Controller 22 controls movement of mobile body 10 that is based on mobile portion 23. Specifically, using the position of mobile body 10 estimated on the basis of distance information obtained by distance measuring sensor 12 and the map information stored in storage 21, controller 22 controls the movement of mobile body 10 that is based on mobile portion 23. By controlling the movement of mobile body 10 that is based on mobile portion 23, controller 22 causes mobile body 10 to function as a reference mobile body or a steerable mobile body. The reference mobile body is a mobile body that temporarily stops at a predetermined position and can be used by a steerable mobile body estimating the position of the steerable mobile body itself. The steerable mobile body is a mobile body that moves while estimating the position thereof by measuring the distance between the steerable mobile body itself and the reference mobile body and performs a predetermined task.

Furthermore, controller 22 controls execution of a task by mobile body 10. In the case where mobile body 10 is a vacuum cleaner, controller 22 controls a dirt-sucking operation to operate suction portion 17 as the task while moving throughout a predetermined region.

Furthermore, controller 22 performs processing for setting a plurality of areas on the basis of a map of a region in which mobile body 10 on surface 9 can move. The processing for setting the plurality of areas will be described later.

Mobile body system 1 executes a task while sequentially moving through the plurality of areas. The operations of the mobile bodies when mobile body system 1 moves from the first area into the second area which are adjacent to each other among the plurality of areas are as follows.

First, at least three mobile bodies included in mobile body system 1 are located in the first area. At this time, each of two mobile bodies among at least the three mobile bodies functions as a reference mobile body which is temporarily not in motion, under control of controller 22, in a position within a first distance over which distance measurement by distance measuring sensor 12 is possible from an arbitrary position in the first area. A mobile body different from the above two mobile bodies among at least the three mobile bodies functions as a steerable mobile body which moves in the first area under control of controller 22 using the position of said mobile body that is estimated on the basis of the distance between said mobile body and each of the reference mobile bodies that has been measured by distance measuring sensor 12 of said mobile body.

Furthermore, the following operations are performed when at least three mobile bodies move from the first area into the second area.

(a) The steerable mobile body moves into a boundary area between the first area and the second area and temporarily stops under control of controller 22 according to measurement of distances to two reference mobile bodies.

(b) The reference mobile bodies sequentially move into the boundary area and temporarily stop under control of controller 22 using two reference mobile bodies or the steerable mobile body temporarily not in motion.

(c) Each of two mobile bodies among at least the three mobile bodies functions as a new reference mobile body as a result of moving to a position within the first distance from an arbitrary position in the second area and temporarily stopping under control of controller 22.

(d) A mobile body different from the new reference mobile bodies among at least the three mobile bodies functions as a new steerable mobile body which moves in the second area under control of controller 22 using the position of said mobile body that is estimated on the basis of the distance between said mobile body and each of the new reference mobile bodies that has been measured by distance measuring sensor 12 of said mobile body.

Note that the function of the reference mobile body and the function of the steerable mobile body can be dynamically changed. Therefore, the function of a mobile body may be changed so that the abovementioned new steerable mobile body is different from the abovementioned steerable mobile body. With this, electric power consumption of mobile bodies is leveled out, and it is advantageous that mobile body system 1 can operate for long hours as a whole. The reference mobile body is referred to also as the first mobile body and the second mobile body, and the steerable mobile body is referred to also as the third mobile body.

Hereinafter, the aforementioned operation will be described in detail using specific examples.

Figure 5:
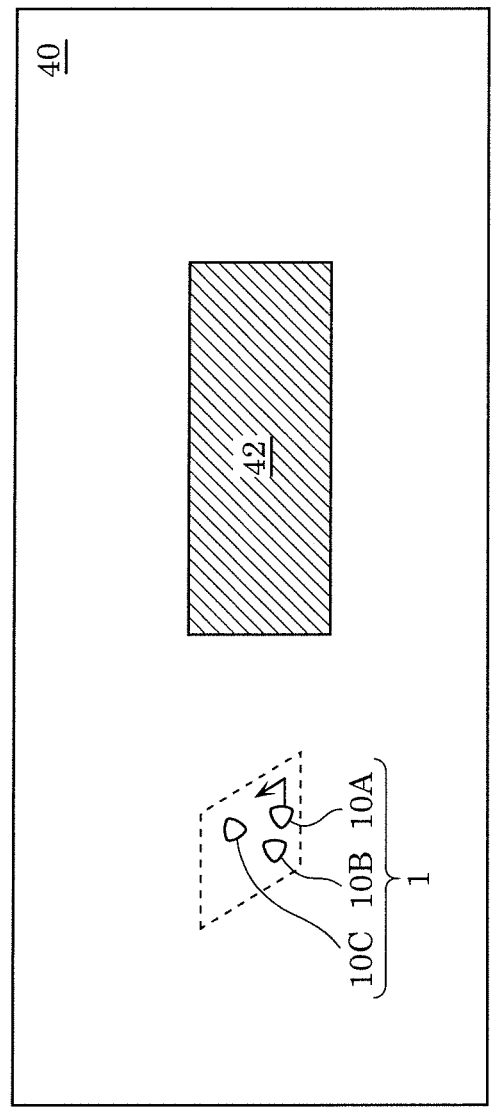
FIG. 5 is an explanatory diagram schematically illustrating one example of a region in which a mobile body system according to an embodiment is capable of moving and mobile bodies located in the region.

FIG. 5 is an explanatory diagram schematically illustrating region 40 which is one example of a region (also referred to as a mobility region) in which mobile body system 1 according to the present embodiment is capable of moving and mobile bodies located in region 40.

As illustrated in FIG. 5, the shape of region 40 is rectangular in top view. Region 42 surrounded by region 40 represents a region in which mobile body system 1 is not capable of moving. For example, region 40 corresponds to space such as a relatively large hall or warehouse, and region 42 corresponds to a room in said space that is surrounded by walls to keep out mobile body 10.

In region 40, mobile bodies 10A, 10B, and 10C (also referred to as mobile body 10A and the like) included in mobile body system 1 perform tasks while moving. Each of mobile body 10A and the like is mobile body 10 described with reference to FIG. 1 to FIG. 4.

Figure 6:
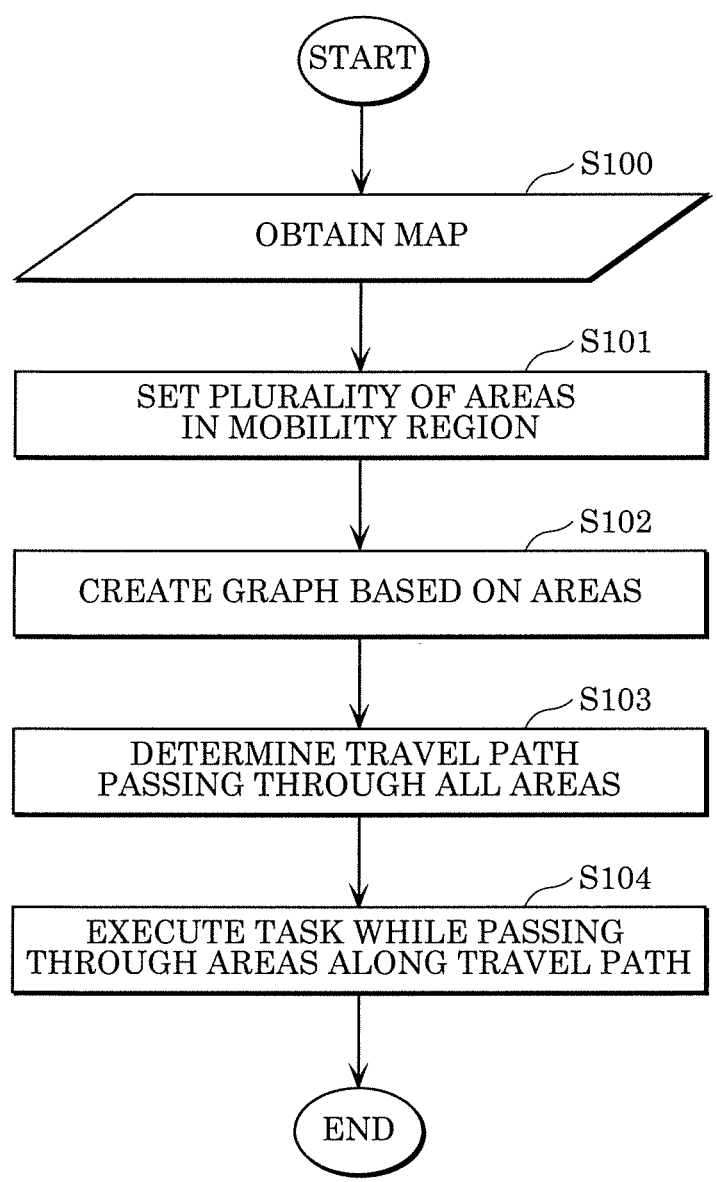
FIG. 6 is a flowchart illustrating processes performed when a mobile body system according to an embodiment passes through a plurality of areas.

FIG. 6 is a flowchart illustrating processes performed when mobile body system 1 according to the present embodiment passes through a plurality of areas.

(Step S100)

Mobile body system 1 obtains a map. Specifically, controller 22 of each of mobile body 10A and the like of mobile body system 1 reads the map stored in storage 21 and thus obtains the map. Note that controller 22 may obtain the map from a device external to mobile body 10A and the like via communication.

(Step S101)

Mobile body system 1 sets a plurality of areas in the mobility region for mobile body 10A and the like on the basis of the map obtained in Step S100. The plurality of areas are set so as to partially overlap adjacent areas. Such an overlap region will be referred to as a boundary area. Note that mobile body system 1 may set the plurality of areas by dividing the mobility region. In this case, the dividing line belongs to both of two areas each having said dividing line as a side. Thus, the dividing line corresponds to the boundary area between the above two areas.

(Step S102)

On the basis of the plurality of areas set in Step S101, mobile body system 1 creates a graph in which each of the areas is shown as a node. The plurality of nodes included in this graph correspond one-to-one with the plurality of areas.

(Step S103)

Mobile body system 1 specifies a travel path passing through all the nodes in the graph created in Step S102.

(Step S104)

Mobile body system 1 executes a task while passing through the areas along the travel path specified in Step S103.

In this manner, mobile body system 1 executes a task while passing through the plurality of areas set in the mobility region. Hereinafter, two examples of the plurality of areas that are set in the mobility region for mobile body 10A and the like will be described.

Figure 7:
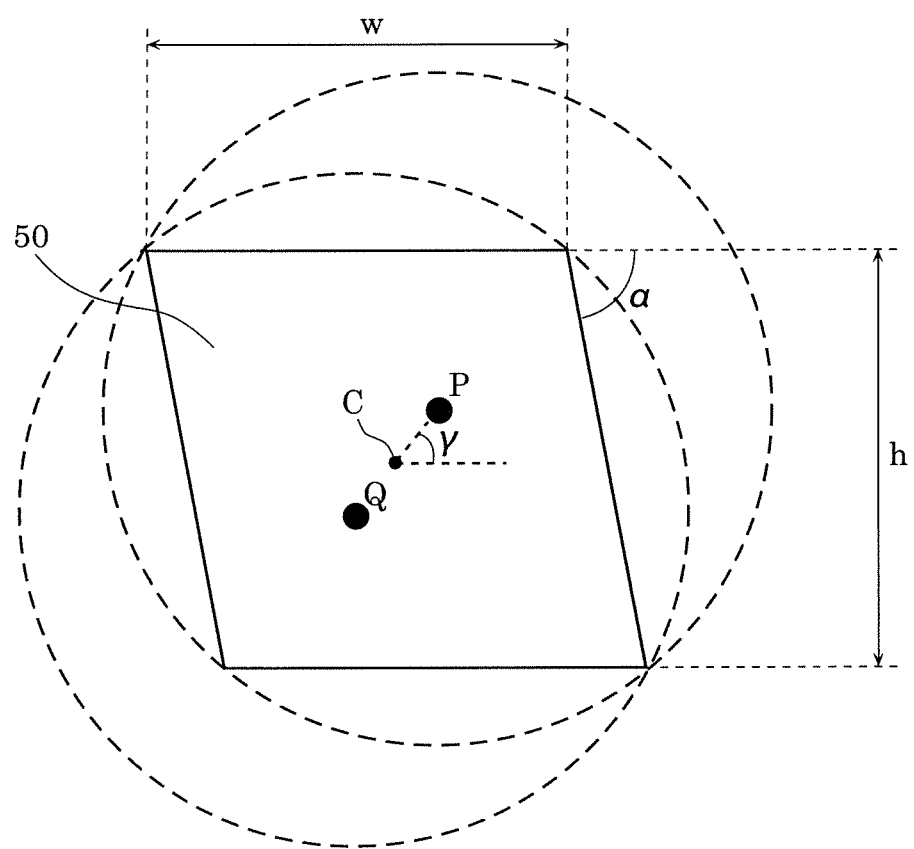
FIG. 7 is an explanatory diagram illustrating the first example of an area set by a mobile body system according to an embodiment.
Figure 8:
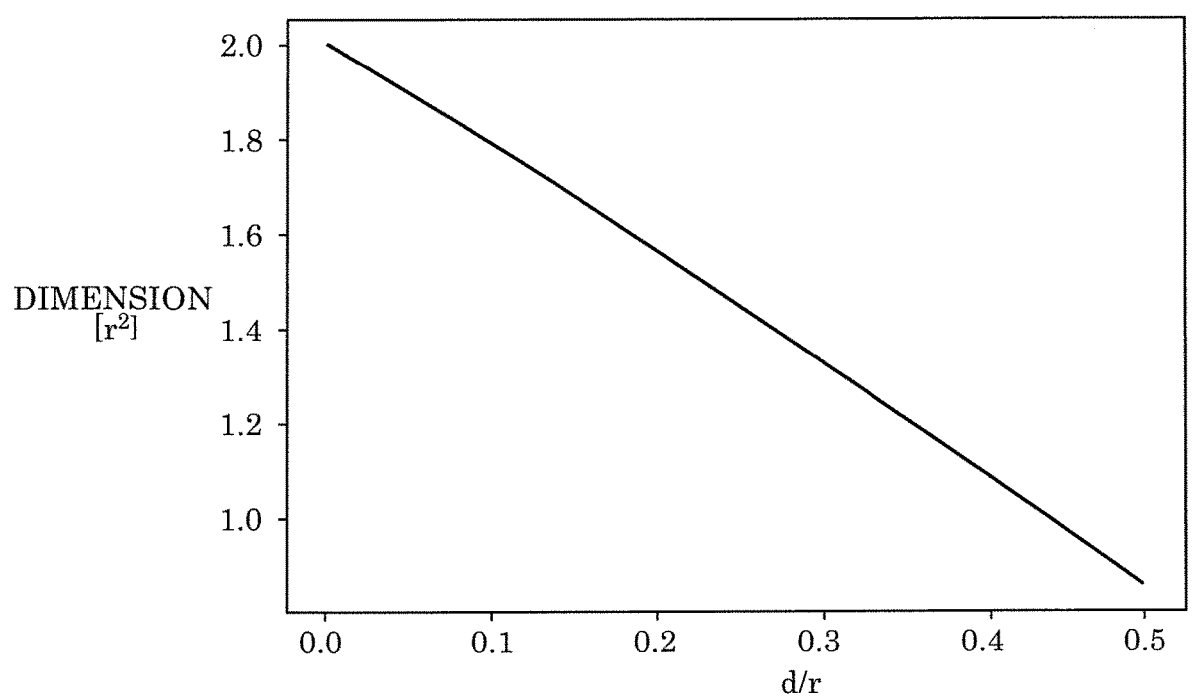
FIG. 8 is an explanatory diagram representing the dimension of the area illustrated in FIG. 7.

FIG. 7 is an explanatory diagram illustrating area 50 which is the first example of the area set by mobile body system 1 according to the present embodiment. FIG. 8 is an explanatory diagram representing the dimension of area 50 illustrated in FIG. 7.

Area 50 is in the shape of a parallelogram. Among the four vertices of this parallelogram, two opposite vertices are two intersections of two circles centered on two points within a distance over which distance measurement by distance measuring sensor 12 is possible from an arbitrary position in said area. Furthermore, this parallelogram is inscribed in the overlap region of the two circles.

In FIG. 7, together with area 50 in the shape of a parallelogram, positions in which distance measurement by distance measuring sensor 12 is possible from an arbitrary position in area 50 are indicated as points P and Q. Point C is the center of area 50.

In this case, y, h, w, and a in FIG. 7 are represented by Expression 1 to Expression 4 indicated below. In these expression, r is a distance over which distance measurement by distance measuring sensor 12 is possible, and the relationship d=‖P−C‖=‖Q−C‖(d<r<2) is satisfied.

[Math. 1]
$$\gamma = \operatorname{atan}\left(\frac{\sqrt{d+r}}{\sqrt{-d+r}}\right) \quad \text{(Expression 1)}$$

[Math. 2]
$$h = \sqrt{2r(r-d)} \quad \text{(Expression 2)}$$

[Math. 3]
$$w = \frac{\sqrt{2r(r+d)}\,(r-d)}{\sqrt{(r)}} \quad \text{(Expression 3)}$$

[Math. 4]
$$\alpha = -\operatorname{atan}\left(\frac{\sqrt{-d^2+r^2}}{d}\right) \quad \text{(Expression 4)}$$

The dimension of area 50 is represented by Expression 5 indicated below.

[Math. 5]
$$(r-d)^{3/2}\sqrt{d+r} \quad \text{(Expression 5)}$$

As illustrated in FIG. 8, the dimension of area 50 is reduced as d/r increases. Furthermore, according to Expression 5, the dimension of area 50 increases as d decreases.

As the dimension of area 50 increases, the number of areas is reduced. Therefore, in the case where mobile body system 1 executes a task for each area, increasing the dimension of each area is advantageous in that processes for executing the task are reduced, resulting in a reduction in process load and a reduction in electric power consumption. Thus, it is possible to increase the effects of a reduction in process load and a reduction in electric power consumption by setting d to the minimum value of a possible distance between two mobile bodies, that is, a distance at which mobile bodies can safely pass each other.

Figure 9:
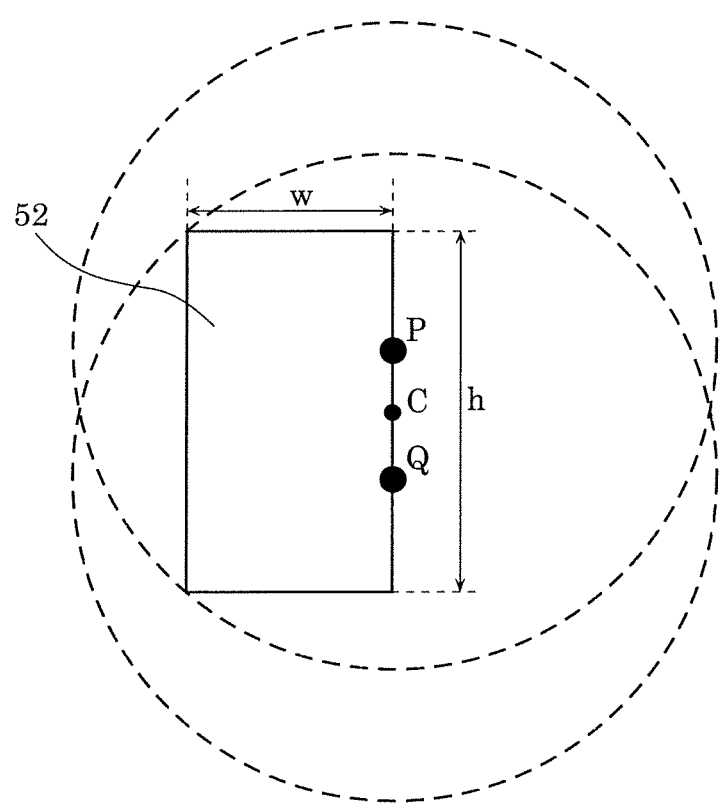
FIG. 9 is an explanatory diagram illustrating the second example of an area set by a mobile body system according to an embodiment.
Figure 10:
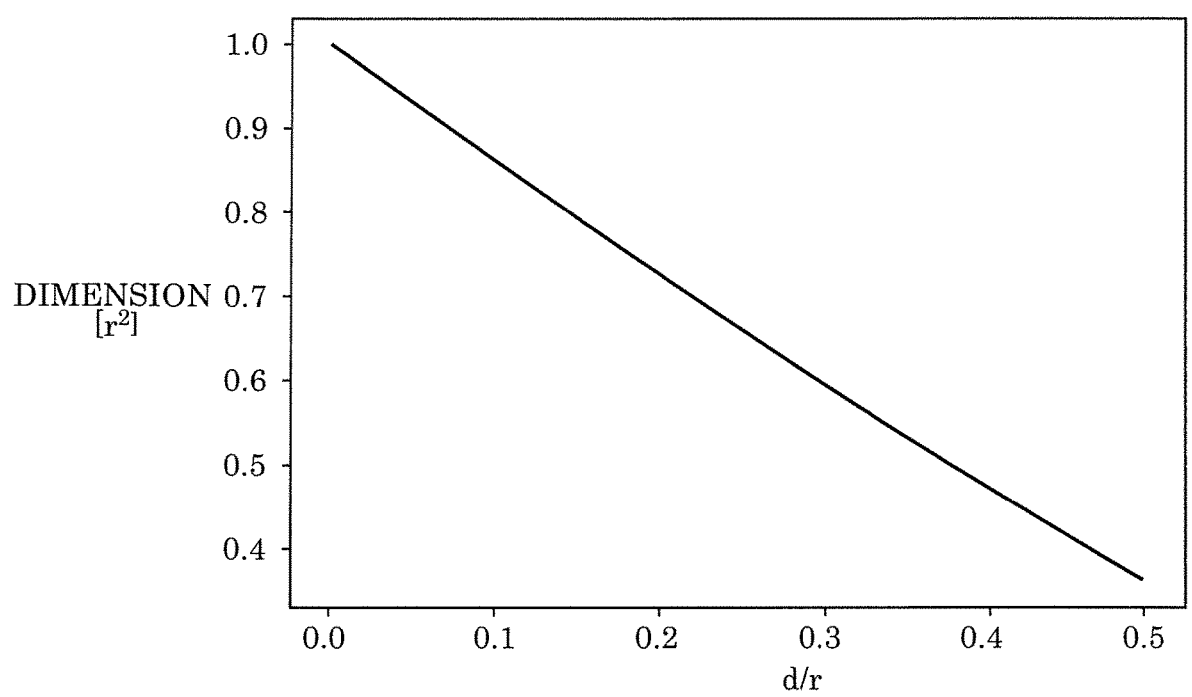
FIG. 10 is an explanatory diagram illustrating the dimension of the area illustrated in FIG. 9.

FIG. 9 is an explanatory diagram illustrating area 52 which is the second example of the area set by mobile body system 1 according to the present embodiment. FIG. 10 is an explanatory diagram representing the dimension of area 52 illustrated in FIG. 9.

Area 52 is in the shape of a rectangle. Two points within the distance over which distance measurement by distance measuring sensor 12 is possible from an arbitrary position in said area are set on a side that is an edge of the rectangle.

In FIG. 9, together with area 52 in the shape of a rectangle, positions in which distance measurement by distance measuring sensor 12 is possible from an arbitrary position in area 52 are indicated as points P and Q. Point C is the midpoint of the right side.

In this case, w and h in FIG. 9 are represented by Expression 6 and Expression 7 indicated below.

[Math. 6]
$$w = \frac{\sqrt{8r^2 - 2d^2 - 2d\sqrt{d^2+8r^2}}}{4} \quad \text{(Expression 6)}$$

[Math. 7]
$$h = -2d + \frac{\sqrt{2d^2 + 2d\sqrt{d^2+8r^2}+8r^2}}{2} \quad \text{(Expression 7)}$$

As with area 50, the dimension of area 52 is reduced as d/r increases (refer to FIG. 10). Thus, it is possible to increase the effects of a reduction in process load and a reduction in electric power consumption by setting d to the minimum value of a possible distance between two mobile bodies.

Figure 11:
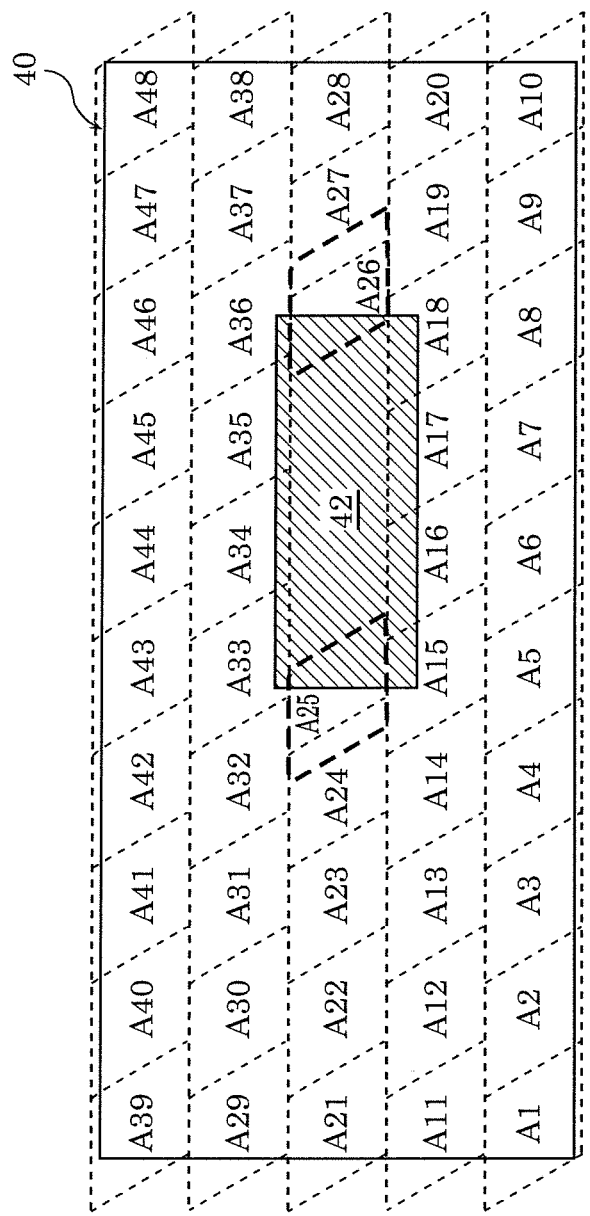
FIG. 11 is an explanatory diagram illustrating a plurality of areas set by a mobile body system according to an embodiment.

FIG. 11 is an explanatory diagram illustrating a plurality of areas set by mobile body system 1 according to the present embodiment. In FIG. 11, 48 areas A1, A2, . . . , A48 are illustrated as the plurality of areas. Area A1 and the like are arranged so that region 40 which is the mobility region is covered by area A1 and the like.

Each of area A1 and the like illustrated in FIG. 11 is area 50 in the shape of a parallelogram illustrated in FIG. 7. In other words, as a result of mobile body system 1 setting areas 50 so as to cover the mobility region illustrated in FIG. 5 (Step S101 in FIG. 6), area A1 and the like are set as illustrated in FIG. 11.

Note that two areas adjacent to each other may be arranged like area A1 and area A2 in positions in which said areas contact each other on a straight line and may be arranged like area A24 and area A25 in positions in which said areas include an elongated boundary area having a width, for example. Furthermore, said areas may include region 42 in which mobile body 10A and the like are not capable of moving like area A25 and area A26, for example. Moreover, said areas may include a region located outside the mobility region like area A1 and area A2, for example.

Note that area A1 and the like may be different in shape or size.

Next, the process of determining a travel path for mobile body system 1 to pass through the set areas will be described. Generally, a travel path passing through a plurality of areas is derived by obtaining a solution of the traveling salesman problem in a graph having the areas as nodes. The solution of the traveling salesman problem can be obtained by a well-known method.

Note that a solution obtained by a general method for solving the traveling salesman problem is based on the condition that one area can be visited only once. In the case of determining a travel path for a mobile body to pass through a plurality of areas as in the present embodiment, one area can be visited twice or more. Thus, a method for determining the travel path using a complete graph in which nodes are connected on the basis of the graph having the areas as the nodes will be described.

Figure 12:
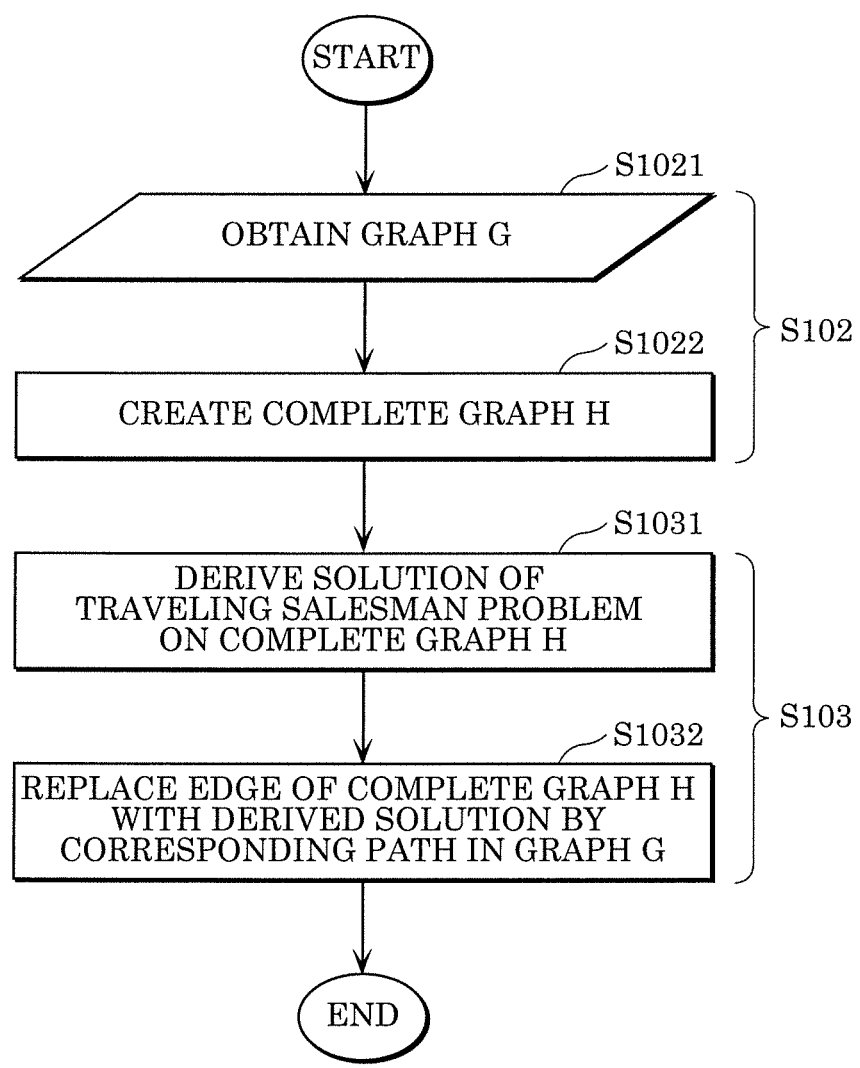
FIG. 12 is a flowchart illustrating processes in which a mobile body system according to an embodiment creates a graph corresponding to a plurality of areas.
Figure 13:
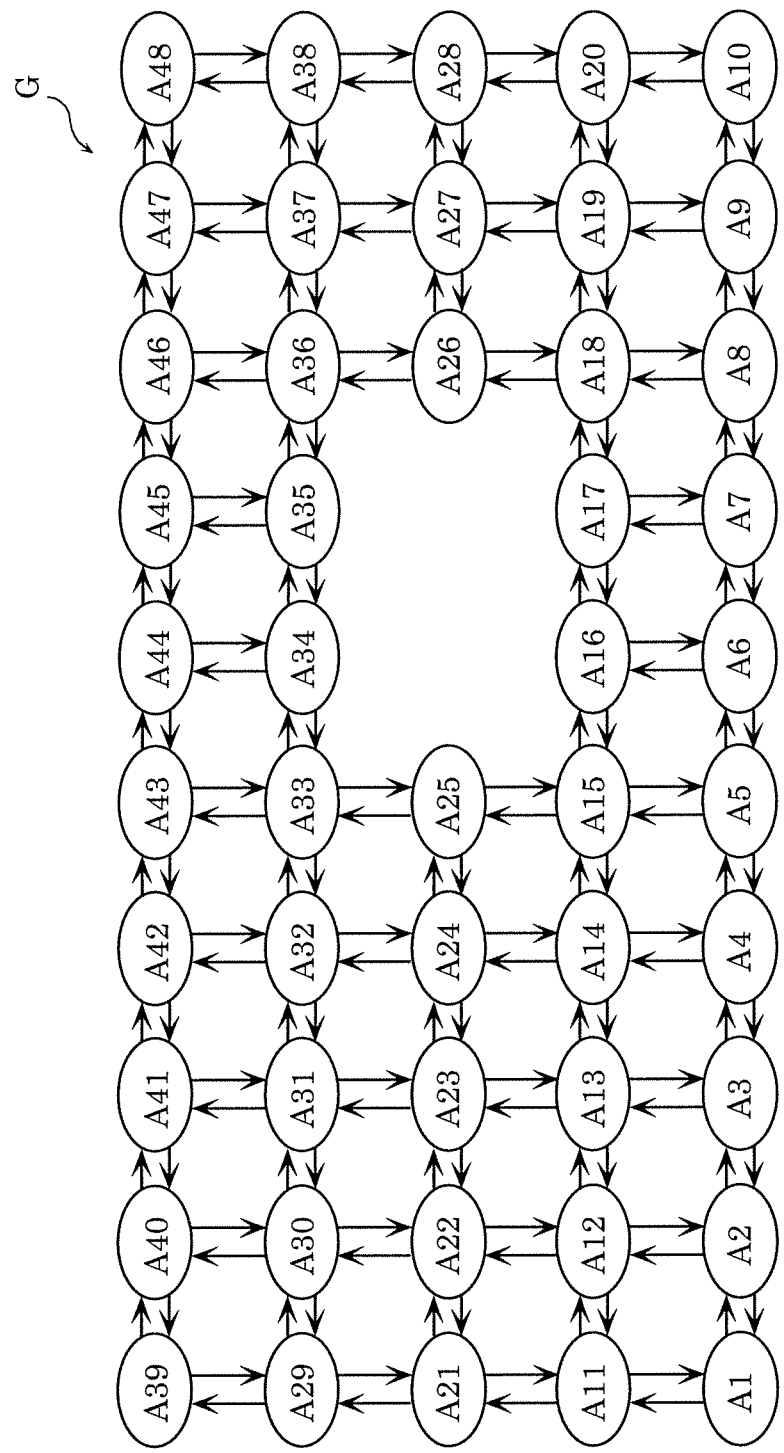
FIG. 13 is an explanatory diagram illustrating a graph obtained by a mobile body system according to an embodiment associating a plurality of areas with nodes.
Figure 14:
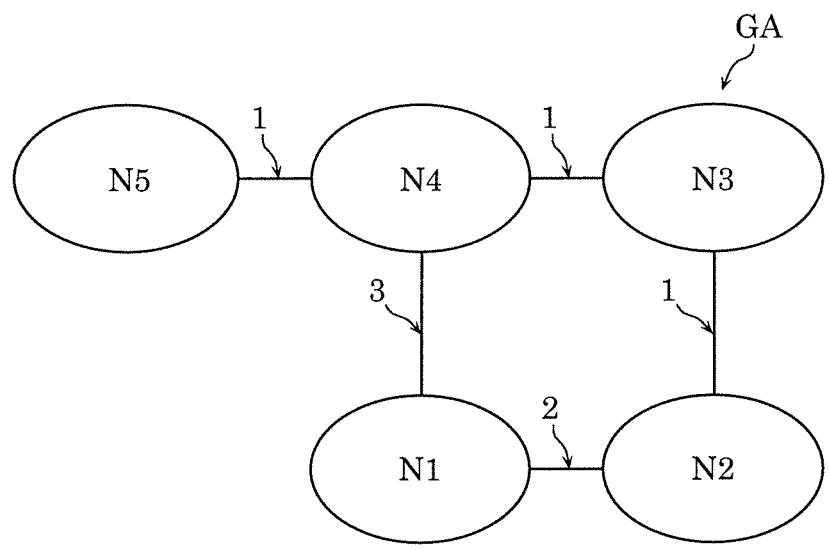
FIG. 14 is the first explanatory diagram illustrating a method for modifying a graph according to an embodiment.
Figure 15:
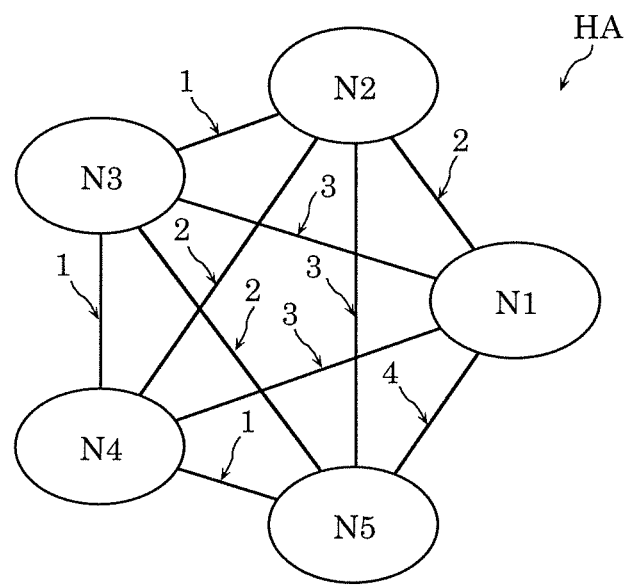
FIG. 15 is the second explanatory diagram illustrating a method for modifying a graph according to an embodiment.
Figure 16:
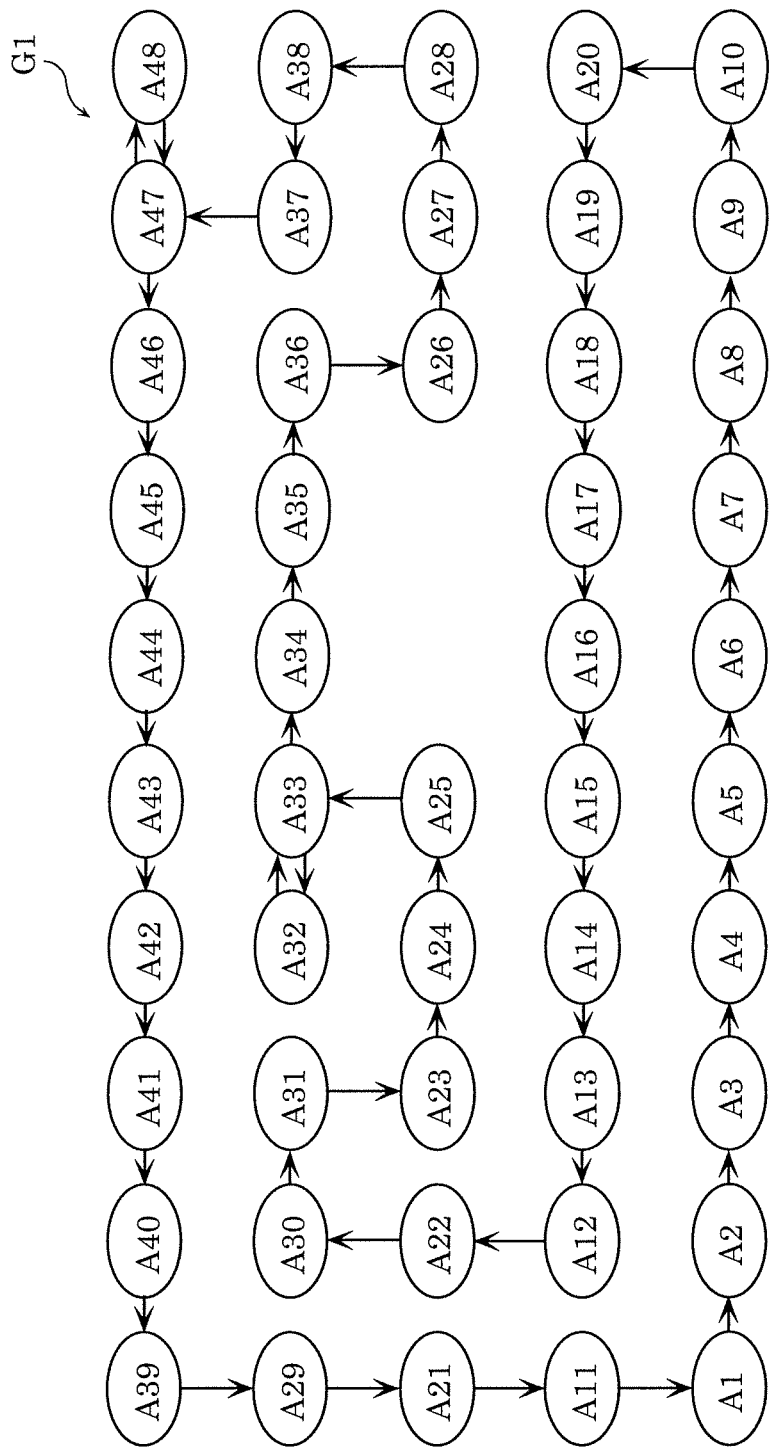
FIG. 16 is an explanatory diagram illustrating one example of a travel path in which a mobile body system according to an embodiment moves through a plurality of areas.

FIG. 12 is a flowchart illustrating processes in which mobile body system 1 according to the present embodiment creates a graph on the basis of the areas. FIG. 13 is an explanatory diagram illustrating a graph obtained by mobile body system 1 according to the present embodiment associating the plurality of areas with the nodes. FIG. 14 and FIG. 15 are explanatory diagrams each illustrating a method for modifying the graph according to the present embodiment. FIG. 16 is an explanatory diagram illustrating one example of the travel path in which mobile body system 1 according to the present embodiment moves through the plurality of areas.

The processes illustrated in FIG. 12 are included in Steps S102 and S103 in FIG. 6.

In Step S1021, mobile body system 1 obtains graph G. As illustrated in FIG. 13, graph G has, as nodes, area A1 and the like illustrated in FIG. 11. Furthermore, two nodes corresponding to two areas adjacent to each other are connected by an edge in graph G.

In Step S1022, mobile body system 1 creates complete graph H having the same nodes as the nodes of graph G. The cost of an edge connecting arbitrary two nodes of complete graph H is set to the minimum cost of a path connecting the two nodes of graph G to each other. A method for creating complete graph H will be described with reference to FIG. 14 and FIG. 15.

Graph GA illustrated in FIG. 14 has five nodes. The cost of each edge connecting the nodes is indicated near the edge. Complete graph HA created on the basis of graph GA is illustrated in FIG. 15.

Complete graph HA illustrated in FIG. 15 has five nodes as does graph GA. The cost of an edge connecting arbitrary two nodes of complete graph HA is set to the minimum cost of a path connecting the two nodes of graph G to each other. For example, the cost of a path from node N1 to node N5 is set to 4 which is the sum of the cost of the edge connecting node N1 and node N4 of graph GA, i.e., 3, and the cost of the edge connecting node N4 and node N5 of graph GA, i.e., 1.

Mobile body system 1 obtains complete graph H by performing, on graph G, the same operation as the operation performed to obtain complete graph HA from graph GA as described above.

In Step S1031, mobile body system 1 derives the solution of the traveling salesman problem (TSP) on complete graph H created in Step S1022. An existing method for solving the traveling salesman problem can be used. For example, mobile body 10 is a vacuum cleaner; in the case of executing a cleaning task, the cost of moving from area Ai into area Aj is less than or equal to the cost of moving from area Ai into area Aj after moving from area Ai into area Ak. In such a case, the well-known Christofides algorithm can be used.

In Step S1032, an edge of complete graph H with the solution derived in Step S1031 is replaced by a corresponding path of graph G. This results in graph G1 in FIG. 16 which illustrates the travel path of mobile body system 1.

Figure 17:
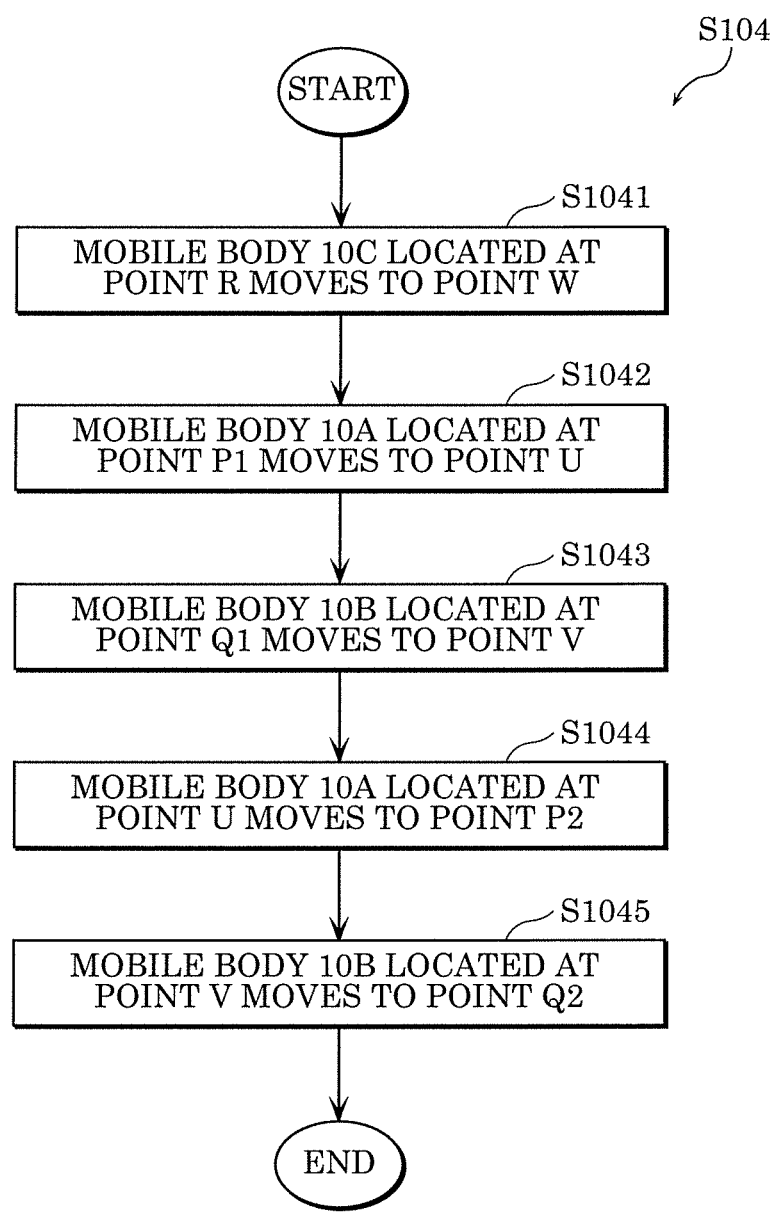
FIG. 17 is a flowchart illustrating operations of mobile bodies when a mobile body system according to an embodiment moves from the first area into the second area.
Figure 18:
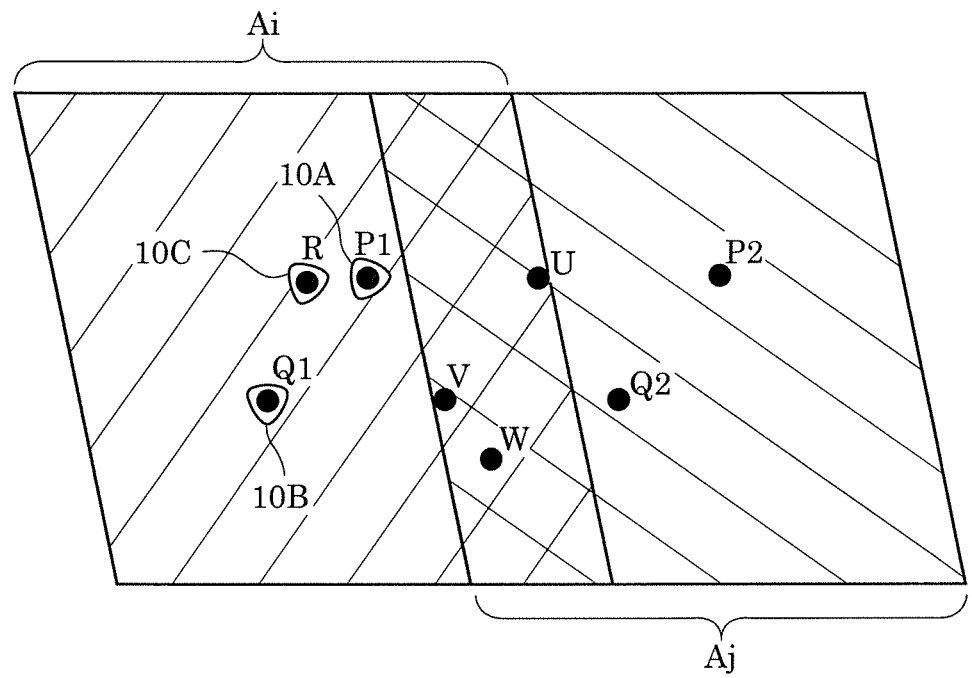
FIG. 18 is the first explanatory diagram illustrating the positions of mobile bodies when a mobile body system according to an embodiment moves from the first area into the second area.
Figure 19:
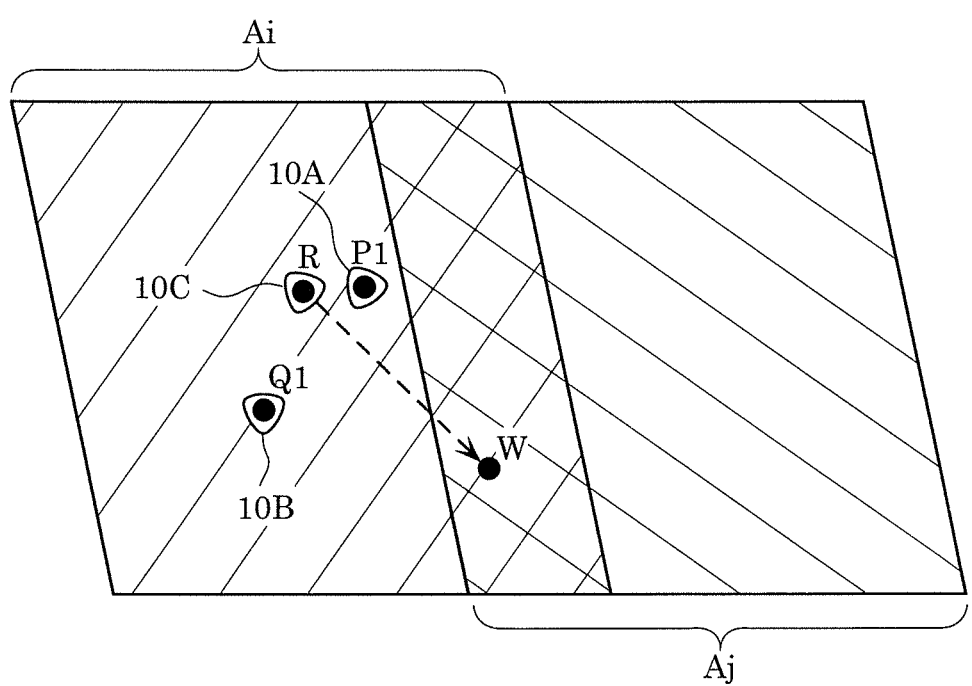
FIG. 19 is the second explanatory diagram illustrating the positions of mobile bodies when a mobile body system according to an embodiment moves from the first area into the second area.
Figure 20:
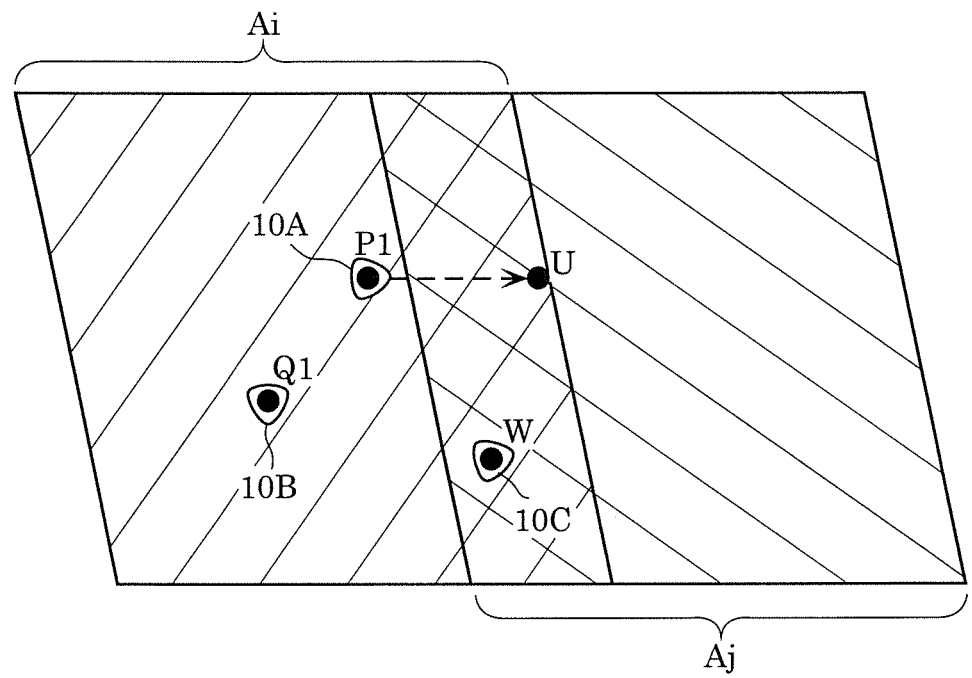
FIG. 20 is the third explanatory diagram illustrating the positions of mobile bodies when a mobile body system according to an embodiment moves from the first area into the second area.
Figure 21:
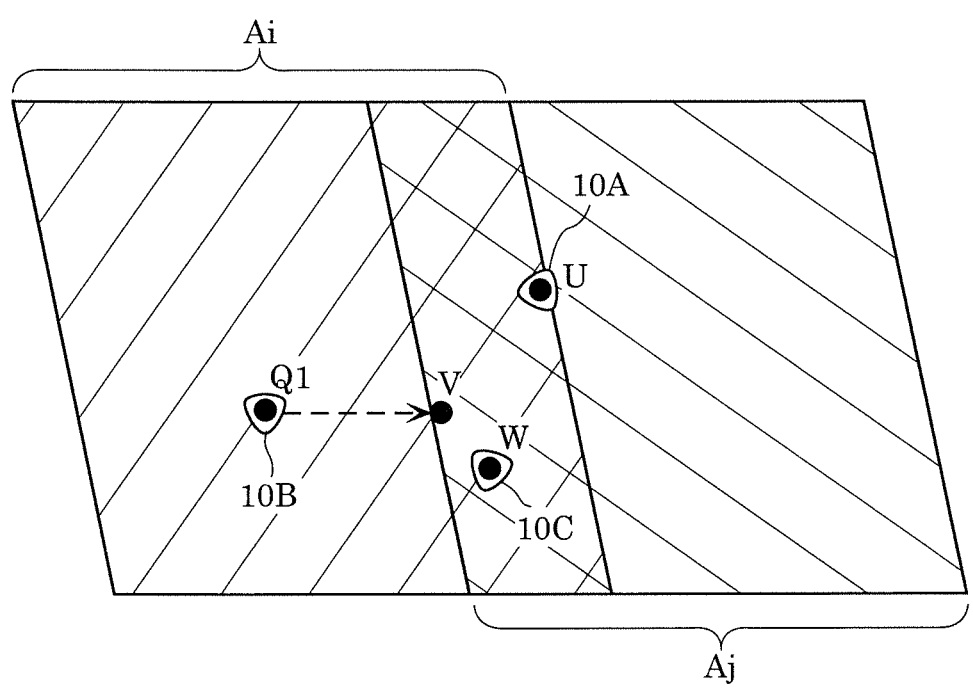
FIG. 21 is the fourth explanatory diagram illustrating the positions of mobile bodies when a mobile body system according to an embodiment moves from the first area into the second area.
Figure 22:
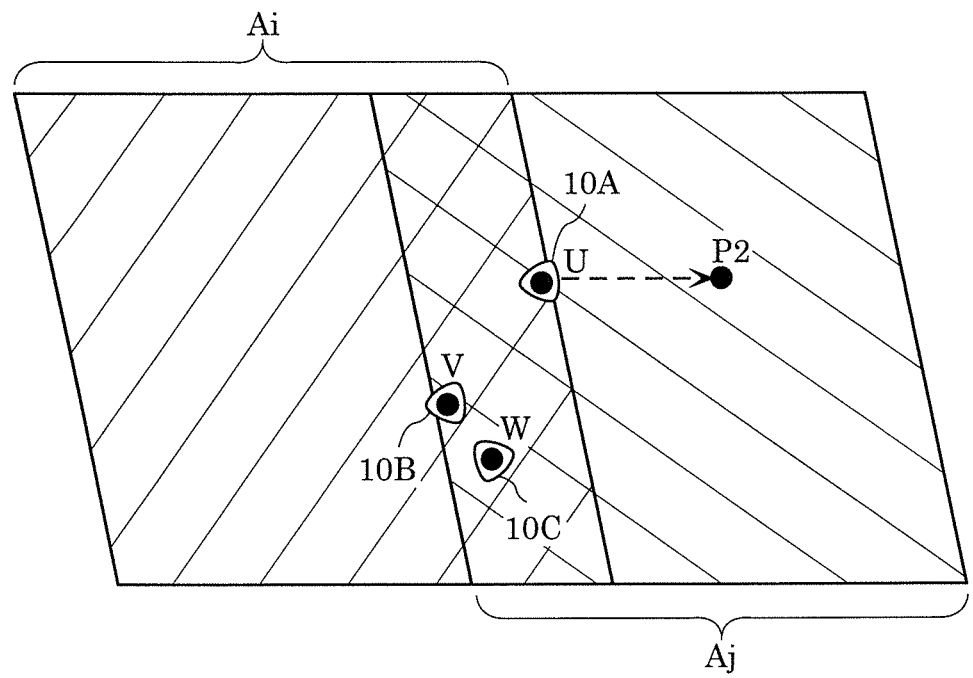
FIG. 22 is the fifth explanatory diagram illustrating the positions of mobile bodies when a mobile body system according to an embodiment moves from the first area into the second area.
Figure 23:
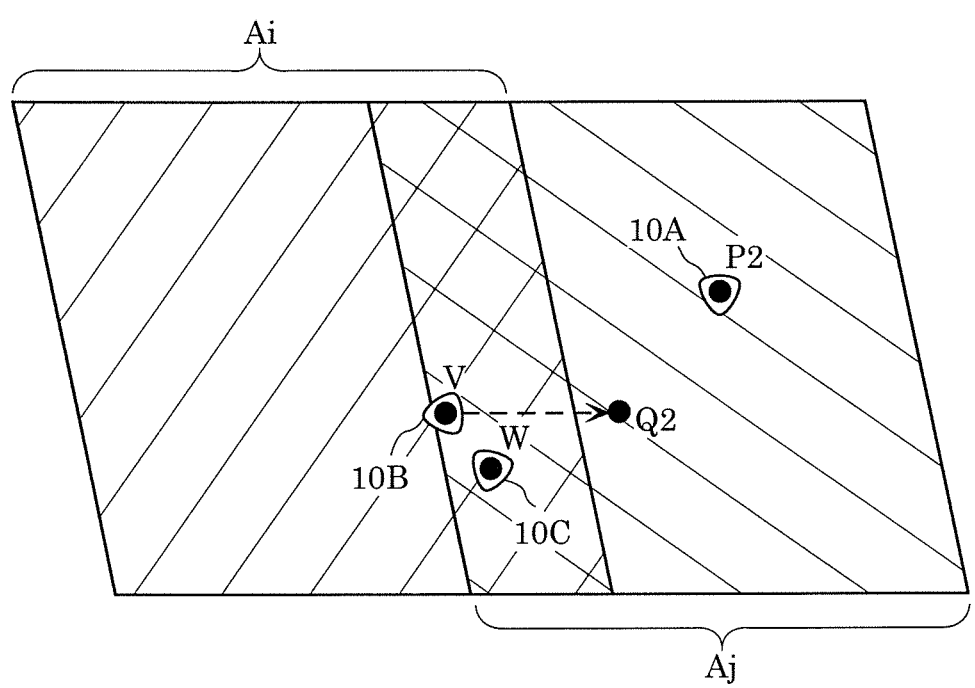
FIG. 23 is the sixth explanatory diagram illustrating the positions of mobile bodies when a mobile body system according to an embodiment moves from the first area into the second area.
Figure 24:
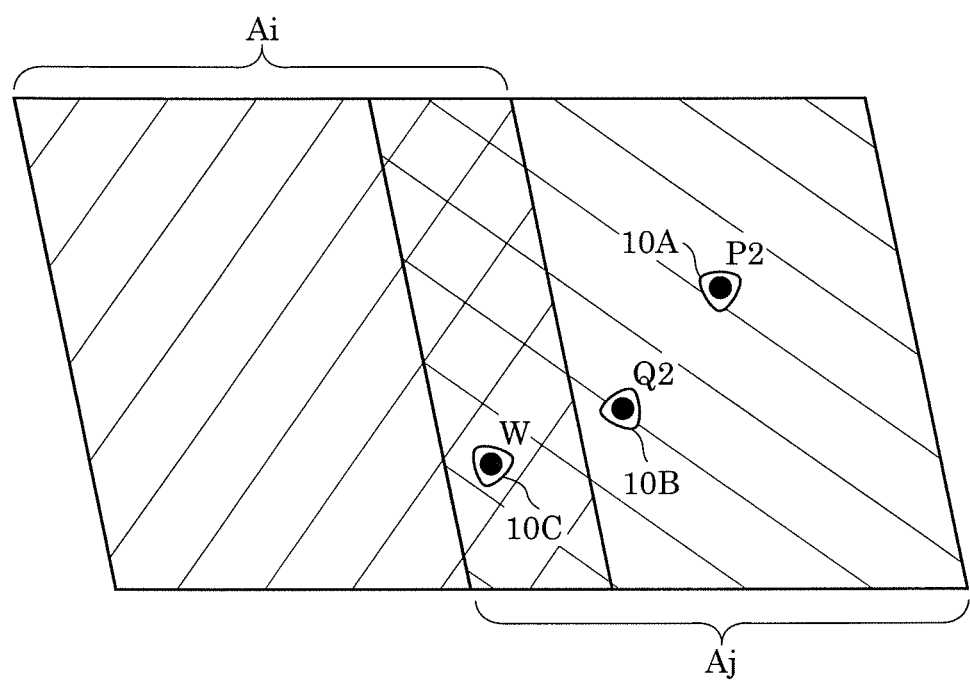
FIG. 24 is the seventh explanatory diagram illustrating the positions of mobile bodies when a mobile body system according to an embodiment moves from the first area into the second area.

FIG. 17 is a flowchart illustrating operations of the mobile bodies when mobile body system 1 according to the present embodiment moves from the first area into the second area. FIG. 18 to FIG. 24 are the first to seventh explanatory diagrams illustrating the positions of the mobile bodies when mobile body system 1 according to the present embodiment moves from the first area into the second area. Note that in FIG. 18, etc., area Ai corresponds to the first area, area Aj corresponds to the second area, and the overlap section of area Ai and area Aj corresponds to the boundary area.

FIG. 17 is a flowchart illustrating detailed processes in Step S104 in FIG. 6.

Assume that first, mobile body system 1 (specifically, mobile bodies 10A, 10B, and 10C) is first located in area Ai which is the first area. Mobile body 10A is temporarily not in motion in the position indicated by point P1, and mobile body 10B is temporarily not in motion in the position indicated by point Q1. Mobile body 10C moves in area Ai while estimating the position of this mobile body itself by measuring the distance between this mobile body and each of mobile bodies 10A, 10B, and thus is executing a task (refer to FIG. 18). A method in which mobile body 10C estimates the position of this mobile body itself by measuring the distance between this mobile body and each of mobile bodies 10A, 10B will be described later.

(Step S1041)

Mobile body 10C located at point R moves to point W. Specifically, mobile body 10C moves to point W while estimating the position of this mobile body itself by measuring the distance between this mobile body and each of mobile bodies 10A, 10B that are temporarily not in motion, and temporarily stops at point W (refer to FIG. 19).

(Step S1042)

Mobile body 10A located at point P1 moves to point U. Specifically, mobile body 10A moves to point U while estimating the position of this mobile body itself by measuring the distance between this mobile body and each of mobile bodies 10B, 10C that are temporarily not in motion, and temporarily stops at point U (refer to FIG. 20).

(Step S1043)

Mobile body 10B located at point Q1 moves to point V. Specifically, mobile body 10B moves to point V while estimating the position of this mobile body itself by measuring the distance between this mobile body and each of mobile bodies 10A, 10C that are temporarily not in motion, and temporarily stops at point V (refer to FIG. 21).

(Step S1044)

Mobile body 10A located at point U moves to point P2. Specifically, mobile body 10A moves to point P2 while estimating the position of this mobile body itself by measuring the distance between this mobile body and each of mobile bodies 10B, 10C that are temporarily not in motion, and temporarily stops at point P2 (refer to FIG. 22).

(Step S1045)

Mobile body 10B located at point V moves to point Q2. Specifically, mobile body 10B moves to point Q2 while estimating the position of this mobile body itself by measuring the distance between this mobile body and each of mobile bodies 10A, 10C that are temporarily not in motion, and temporarily stops at point Q2 (refer to FIG. 23).

When Step S1045 described above is completed, entire mobile body system 1 (specifically, mobile bodies 10A, 10B, and 10C) is located in area Aj which is the second area. Mobile body 10A is temporarily not in motion in the position indicated by point P2, and mobile body 10B is temporarily not in motion in the position indicated by point Q2. Mobile body 10C moves in area Aj while estimating the position of this mobile body itself by measuring the distance between this mobile body and each of mobile bodies 10A, 10B, and thus is executing a task (refer to FIG. 24).

Figure 25:
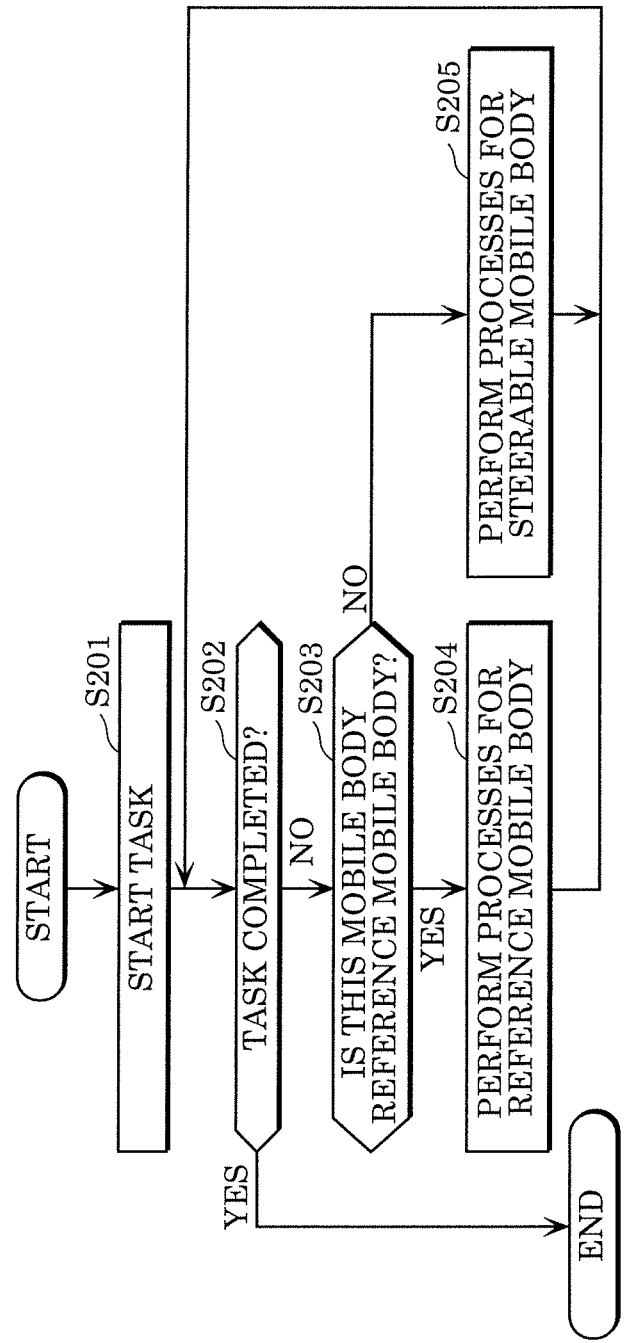
FIG. 25 is a flowchart illustrating processes performed by a mobile body according to an embodiment.

FIG. 25 is a flowchart illustrating processes performed by mobile body 10 according to the present embodiment.

(Step S201)

Mobile body 10 starts a task.

(Step S202)

Mobile body 10 determines whether or not the task has been completed. For example, in the case where the task is cleaning region 40, when mobile body system 1 has moved through all the positions in region 40 while sucking up dirt, the task is determined as having been completed. When the task is determined as having been completed (YES in Step S202)), a series of processes illustrated in FIG. 25 is brought to an end; otherwise (NO in Step S202), the processing proceeds to Step S202.

(Step S203)

Controller 22 of mobile body 10 determines whether or not this mobile body is a reference mobile body. When this mobile body is a reference mobile body (YES in Step S203), the processing proceeds to Step S204; otherwise (NO in Step S203), the processing proceeds to Step S205.

(Step S204)

Mobile body 10 performs processes for the reference mobile body. Details of the processes for the reference mobile body will be described later.

(Step S205)

Mobile body 10 performs processes for the steerable mobile body. Details of the processes for the steerable mobile body will be described later.

When Step S204 or S205 ends, mobile body 10 performs the process in Step S202 again.

Figure 26:
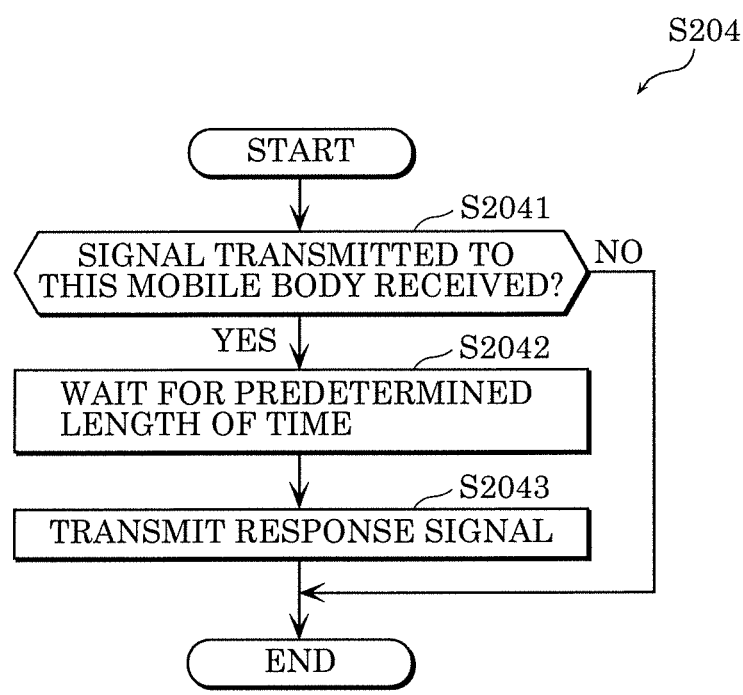
FIG. 26 is a flowchart illustrating processes for a reference mobile body performed by a mobile body according to an embodiment.

FIG. 26 is a flowchart illustrating processes for the reference mobile body performed by mobile body 10 according to the present embodiment. A series of processes included in FIG. 26 indicates details of the process in Step S204 in FIG. 25.

(Step S2041)

Mobile body 10 determines whether or not the light receiver of distance measuring sensor 12 has received a signal transmitted to this mobile body. This signal is, for example, an optical signal transmitted by distance measuring sensor 12 of another mobile body, and includes at least ID that is unique to the mobile body that has transmitted the signal and ID that is unique to the mobile body to which the signal is transmitted (that is, the mobile body that receives the optical signal). When it is determined that the signal transmitted to this mobile body has been received (YES in Step S2041), the processing proceeds to Step S2042; otherwise (NO in Step S2041), the series of processes illustrated in FIG. 26 is brought to an end.

(Step S2042)

Mobile body 10 waits for a predetermined length of time. The predetermined length of time is, for example, approximately 10 milliseconds to 100 milliseconds.

(Step S2043)

Mobile body 10 transmits a response signal as a response to the signal received in Step S2041. The response signal to be transmitted includes at least ID that is unique to mobile body 10 that transmits the response signal and ID that is unique to a mobile body to which the response signal is transmitted (that is, a mobile body that receives the response signal).

By way of the series of processes illustrated in FIG. 26, the reference mobile body transmits a response signal for the signal received from the steerable mobile body and contributes to estimation of the position of the steerable mobile body that is carried out by the steerable mobile body itself.

Figure 27:
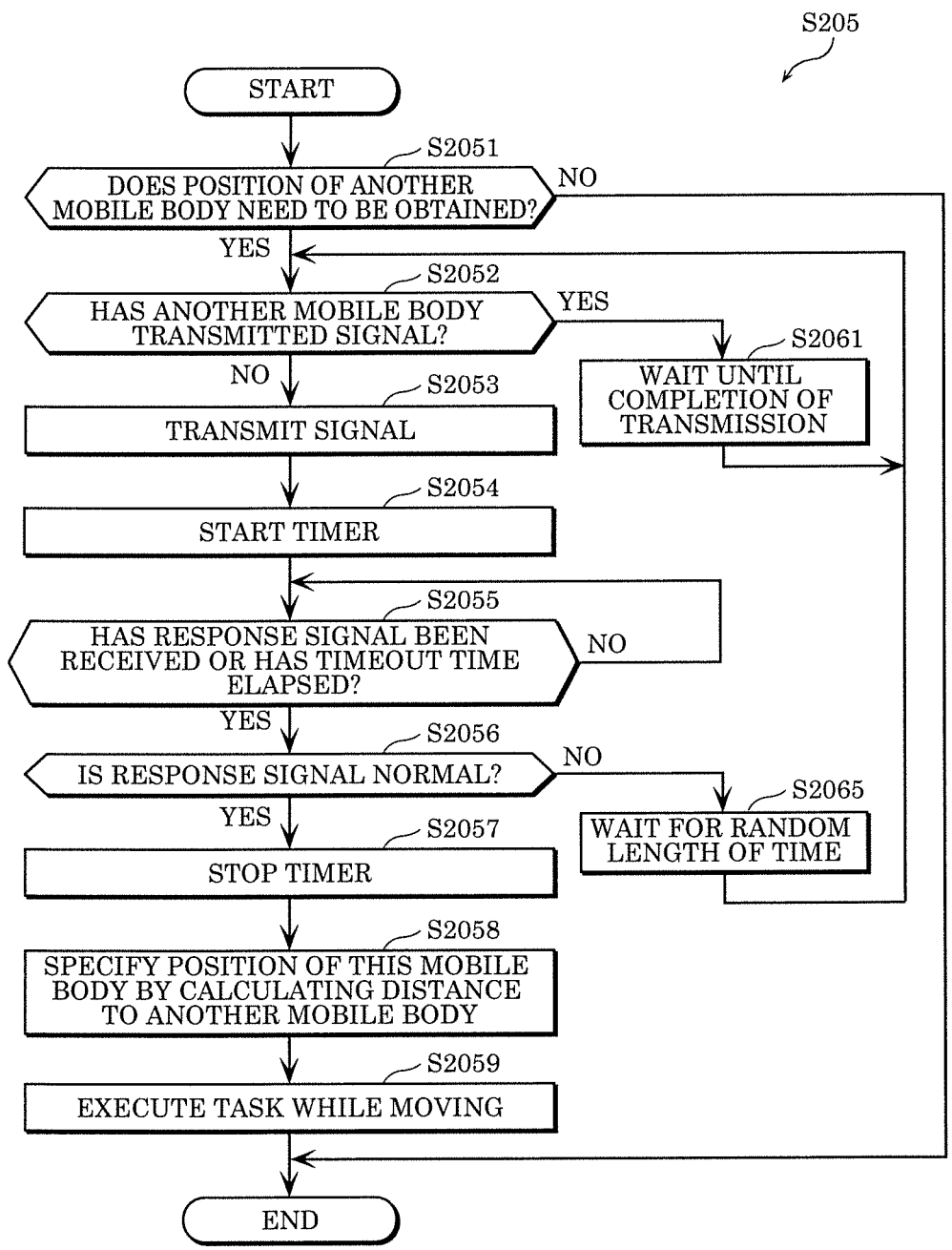
FIG. 27 is a flowchart illustrating processes for a steerable mobile body performed by a mobile body according to an embodiment.

FIG. 27 is a flowchart illustrating processes for the steerable mobile body performed by mobile body 10 according to the present embodiment.

(Step S2051)

Mobile body 10 determines whether or not the position of another mobile body needs to be obtained. For example, when mobile body 10 is the steerable mobile body, this mobile body determines that the position of another mobile body needs to be obtained. When mobile body 10 determines that the position of another mobile body needs to be obtained (YES in Step S2051), the processing proceeds to Step S2052; otherwise (NO in Step S2051), a series of processes illustrated in FIG. 27 is brought to an end.

(Step S2052)

Mobile body 10 determines whether or not another mobile body has transmitted a signal. When it is determined that another mobile body has transmitted a signal (YES in Step S2052), Step S2052 is repeated after waiting for the end of transmission of the signal (Step S2061). On the other hand, when it is determined that another mobile body has not transmitted signals (NO in Step S2052), the processing proceeds to Step S2053.

(Step S2053)

Mobile body 10 transmits a signal. The signal to be transmitted includes at least ID of mobile body 10 that transmits the signal.

(Step S2054)

Mobile body 10 starts a timer.

(Step S2055)

Mobile body 10 determines whether or not the light receiver of distance measuring sensor 12 has received any signal. When it is determined that any signal has not been received, mobile body 10 further determines whether or not time-out time for receiving a response signal has elapsed. When some signal has been received or when the time-out time has elapsed, the processing proceeds to Step S2056; otherwise, the processing proceeds to Step S2055. In other words, the mobile body waits in Step S2055 until the light receiver of distance measuring sensor 12 receives some signal. Note that the time-out time is a predetermined length of time and can, for example, be set to twice as long as the stand-by time for the reference mobile body.

(Step S2056)

Mobile body 10 determines whether or not the signal received in Step S2055 is a normal response signal as a response to be made by the reference mobile body for the signal transmitted in Step S2053. When the signal is determined as a normal response signal (YES in Step S2056), the processing proceeds to Step S2057; otherwise (NO in Step S2056), the processing proceeds to Step S2502 after waiting for a random length of time (Step S2065).

(Step S2057)

Mobile body 10 causes the timer to stop and measures the time elapsed between when the timer is started in Step S2054 and when the timer is stopped in the present step.

(Step S2058)

On the basis of the time measured in Step S2057, mobile body 10 calculates the distance to the reference mobile body, and thus specifies the position of this mobile body 10 itself. Specifically, the time measured in Step S2057 includes time taken until light emitted by the light emitter of distance measuring sensor 12 reaches the reference mobile body after the emission, time for which the reference mobile body waits (refer to Step S2042 in FIG. 26), and time taken until the light receiver of distance measuring sensor 12 receives light including the response signal after the reference mobile body emits the light. Thus, the time for which the reference mobile body waits is subtracted from the time measured in Step S2057, and the obtained result is divided by 2, resulting in time required for the light to proceed one way from mobile body 10 to the reference mobile body; using this result, the one-way distance is obtained. The processes of calculating the distance to the reference mobile body and specifying the position of this mobile body itself will be described later in detail.

(Step S2059)

Mobile body 10 executes the task while moving using the position of this mobile body itself calculated in Step S2058.

By way of the series of processes illustrated in FIG. 27, the steerable mobile body moves and executes the task while specifying the position of this mobile body itself through measurement of the distance between this mobile body and the reference mobile body.

Figure 28:
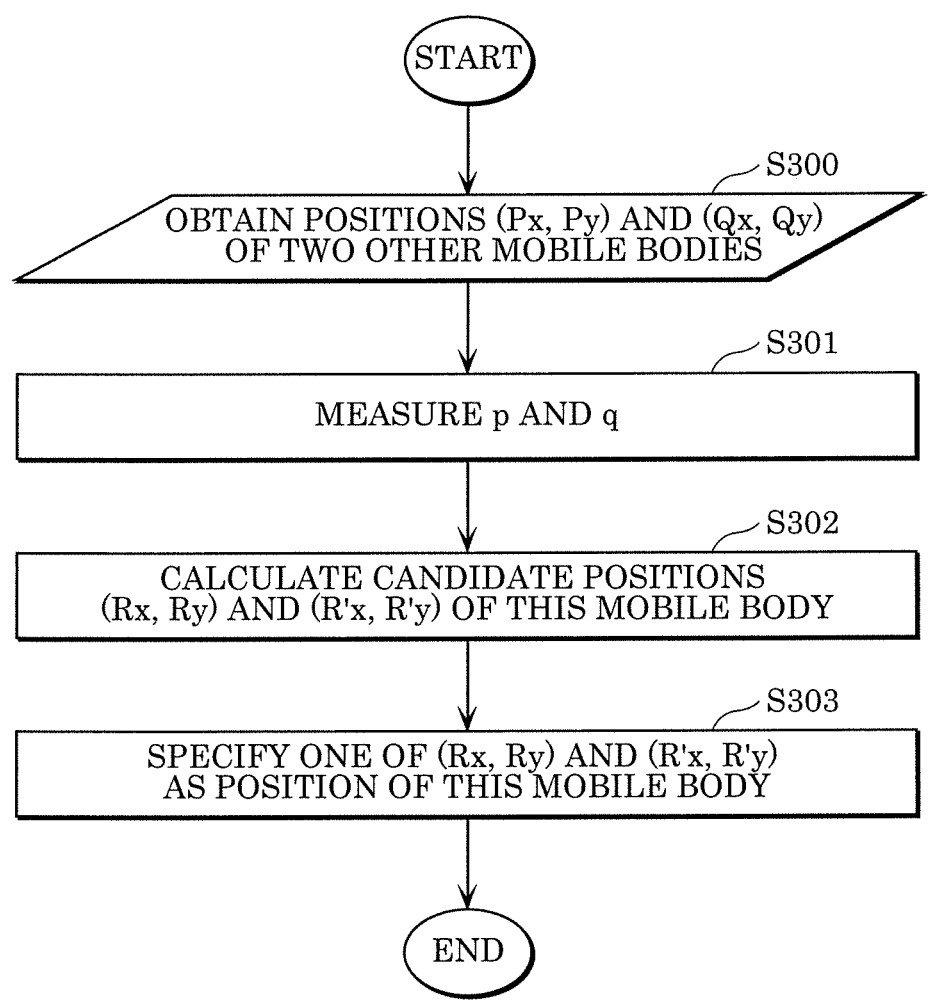
FIG. 28 is a flowchart illustrating processes in which a mobile body according to an embodiment estimates the position of this mobile body itself using the positions of two reference mobile bodies and the distances to the two reference mobile bodies.
Figure 29:
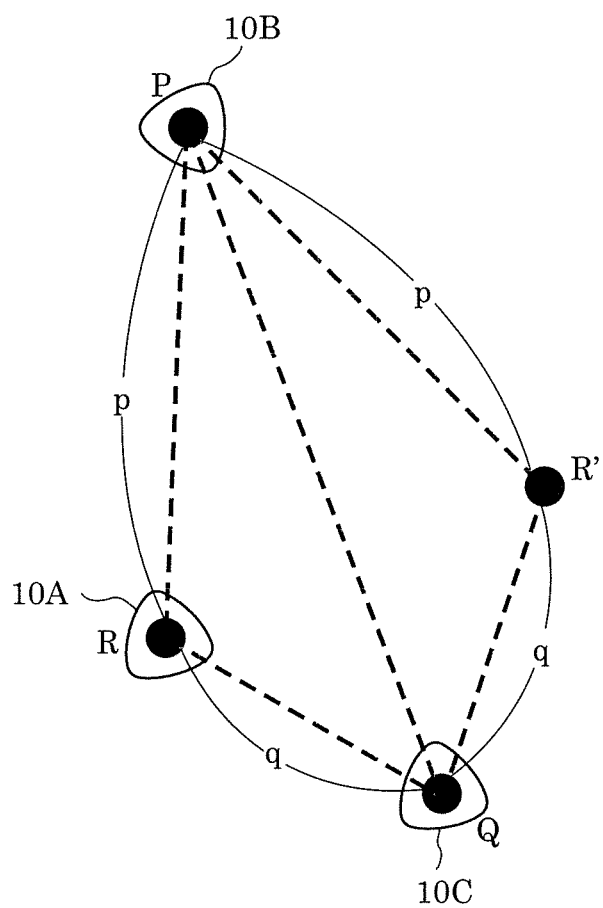
FIG. 29 is an explanatory diagram illustrating the positional relationship when a mobile body according to an embodiment estimates the position of this mobile body itself using the positions of two reference mobile bodies and the distances to the two reference mobile bodies.

FIG. 28 is a flowchart illustrating processes in which mobile body 10A (also referred to as this mobile body) according to the present embodiment estimates the position of this mobile body itself using the positions of two reference mobile bodies, i.e., mobile bodies 10B, 10C (also referred to as another mobile body) and the distances to the two reference mobile bodies, i.e., mobile bodies 10B, 10C. FIG. 29 is an explanatory diagram illustrating the positional relationship when mobile body 10A according to the present embodiment estimates the position of this mobile body itself using the positions of two reference mobile bodies and the distances to the two reference mobile bodies.

Assume a situation in which mobile body 10A is located in point R in FIG. 29 and the current position of this mobile body is not known. Mobile body 10B and mobile body 10C each function as the reference mobile body and are temporarily not in motion at point P and point Q, respectively.

In this state, using the positions of the two reference mobile bodies, i.e., mobile bodies 10B, 10C, and the distances to the two reference mobile bodies, i.e., mobile bodies 10B, 10C, that can be obtained by distance measuring sensor 12, mobile body 10A specifies the position of this mobile body itself by way of the following processes.

In Step S300, mobile body 10A obtains P(Px, Py) and Q(Qx, Qy) indicating the positions of the two reference mobile bodies, i.e., mobile bodies 10B, 10C. Note that P(Px, Py) and Q(Qx, Qy) indicating the positions of mobile bodies 10B, 10C can be obtained, for example, via mutual information communication between mobile body 10A and the like.

In Step S301, on the basis of distance measurement by distance measuring sensor 12, mobile body 10A measures distance p between this mobile body 10A itself and one of the two reference mobile bodies, i.e., mobile body 10B, and distance q between this mobile body 10A itself and the other of the two reference mobile bodies, i.e., mobile body 10C. Here, Dx and Dy are defined by the following equations: Dx=Qx−Px and Dy=Qy−Py. Processes in which mobile body 10A measures distances p, q will be described later in detail.

In Step S302, the mobile body calculates R(Rx, Ry) and R'(R'x, R'y) indicating two candidate positions of this mobile body itself using Expression 8, Expression 9, Expression 10, and Expression 11 indicated below.

[Math. 8]

$$R_x = P_x + \frac{\left(D_y\left(D_x\sqrt{\begin{array}{c}(-D_x^2-D_y^2+p^2+2pq+q^2)\\(D_x^2+D_y^2-p^2+2pq-q^2)\end{array}}-\right)+D_y\left(D_z^2+D_y^2+p^2-q^2\right)\right)+(D_z^2+D_y^2)(D_x^2+D_y^2+p^2-q^2)}{(2D_x(D_x^2+D_y^2))} \quad \text{(Expression 8)}$$

[Math. 9]

$$R_y = P_y + \frac{\left(-D_x\sqrt{\begin{array}{c}(-D_x^2-D_y^2+p^2+2pq+q^2)\\(D_x^2+D_y^2-p^2+2pq-q^2)\end{array}}+D_y(D_x^2+D_y^2+p^2-q^2)\right)}{(2(D_x^2+D_y^2))} \quad \text{(Expression 9)}$$

[Math. 10]

$$R'_x = P_x + \frac{\left(-D_y\left(D_x\sqrt{\begin{array}{c}(-D_x^2-D_y^2+p^2+2pq+q^2)\\(D_x^2+D_y^2-p^2+2pq-q^2)\end{array}}+\right)+D_y\left(D_z^2+D_y^2+p^2-q^2\right)\right)+(D_z^2+D_y^2)(D_x^2+D_y^2+p^2-q^2)}{(2D_x(D_x^2+D_y^2))} \quad \text{(Expression 10)}$$

[Math. 11]

$$R'_y = P_y + \frac{\left(D_x\sqrt{\begin{array}{c}(-D_x^2-D_y^2+p^2+2pq+q^2)\\(D_x^2+D_y^2-p^2+2pq-q^2)\end{array}}+D_y(D_x^2+D_y^2+p^2-q^2)\right)}{(2(D_x^2+D_y^2))} \quad \text{(Expression 11)}$$

In Step S303, mobile body 10A specifies, as the position of this mobile body itself, one of R(Rx, Ry) and R'(R'x, R'y) indicating the two candidate positions of this mobile body itself. Various methods are applicable as a method for specifying the position of this mobile body. For example, in the case where the last position is stored, mobile body 10A can specify a position on the same side as the last position relative to straight line PQ. This is because it is considered unlikely that the mobile body moves to a position on the opposite side across straight line PQ in a relatively short period of time since the last distance measurement.

In the above-described manner, mobile body 10A specifies the position of this mobile body itself using the positions of two reference mobile bodies, i.e., mobile bodies 10A, 10B, and the distances to the two reference mobile bodies, i.e., mobile bodies 10A, 10B, that can be obtained by distance measuring sensor 12.

Figure 30:
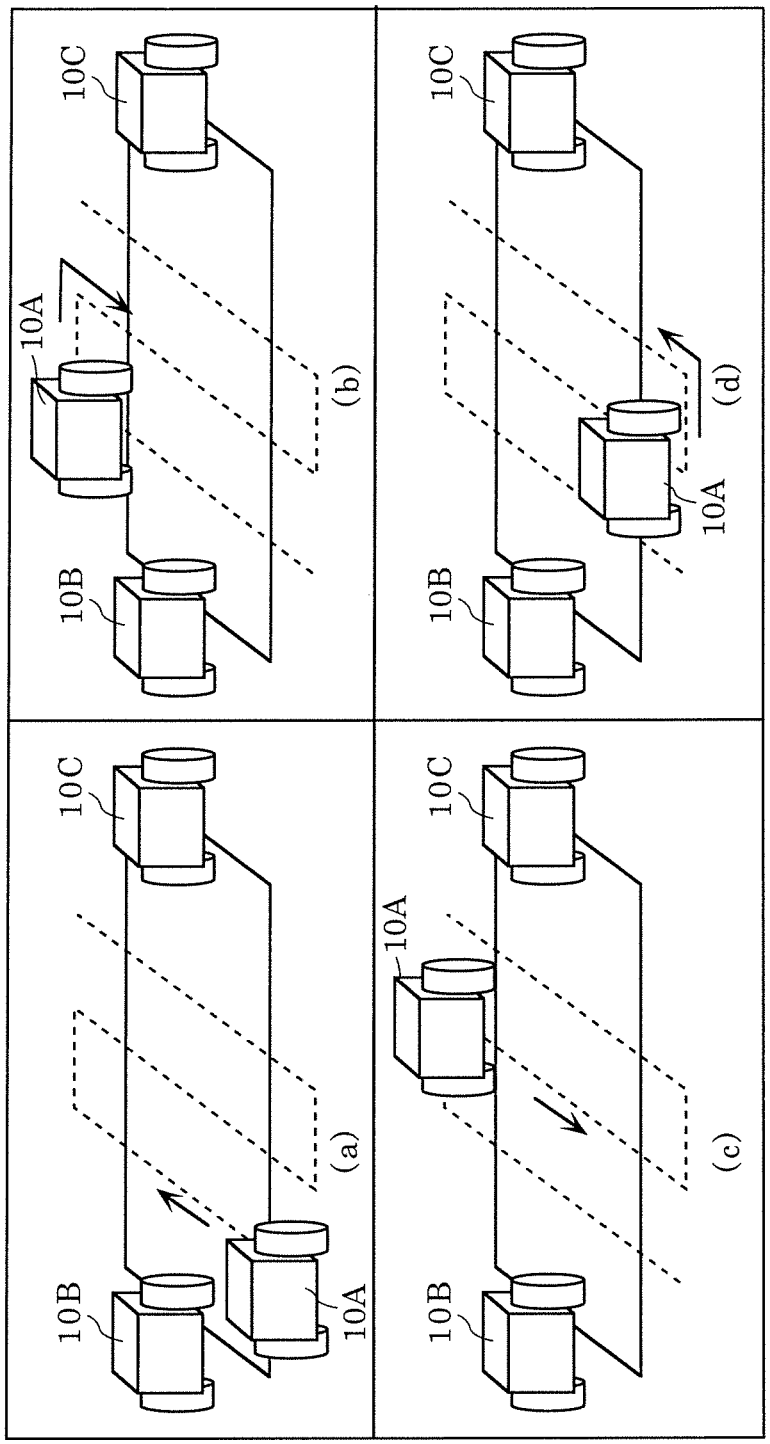
FIG. 30 is an explanatory diagram illustrating one example of a task for a reference mobile body according to an embodiment.

Note that the task can be executed not only by the steerable mobile body, but also by the reference mobile body. FIG. 30 is an explanatory diagram illustrating one example of the task for the reference mobile body according to the present embodiment.

In the case where the mobile body is a vacuum cleaner and a surface to be cleaned by the vacuum cleaner is a surface of a carpet disposed on a fixed surface of concrete or the like, when the mobile body travels while doing the cleaning on wheels on the surface of the carpet, the carpet may be displaced with respect to the fixed surface. The fixed surface include a carpet. In other words, this also applies to a carpet on a carpet.

Thus, as illustrated in (a) to (d) in FIG. 30, mobile body 10A serving as the steerable mobile body does the cleaning while moving, mobile bodies 10B, 10C each serving as the reference mobile body executes the task of pressing a surface of a carpet against a fixed surface. This produces an advantageous effect of keeping the carpet from being displaced with respect to the fixed surface when mobile body 10A travels while doing the cleaning on the surface of the carpet. For example, mobile body 10A moves along a travel path passing over the straight line connecting mobile body 10B and mobile body 10C. In the case where mobile body 10A reciprocates on the carpet, the travel path is desirably set to increase the number of times mobile body 10A passes over the straight line connecting mobile body 10B and mobile body 10C. In one example illustrated in FIG. 30, mobile body 10B and mobile body 10C are located on different sides of a carpet to fix the carpet with respect to a side of the carpet over which mobile body 10A passes during movement from the fixed surface to the carpet and from the carpet to the fixed surface. For example, it is sufficient that at least a portion of mobile body 10B and mobile body 10C be located on the carpet in a plan view. Furthermore, mobile body 10B and mobile body 10C are desirably located within a predetermined distance from one of the four sides of the carpet. Note that the outline of the carpet does not need to be defined by four sides; the same applies to the case where the outline of the carpet is defined by more than four sides.

One example of the predetermined distance is 10 cm to 30 cm or within the size of the mobile body in the width direction. Furthermore, mobile bodies 10B, 10C are desirably located to fix different sides of the carpet. For example, in FIG. 30, mobile bodies 10B, 10C are located on different edges of the carpet.

Note that a boundary of an area is not actually drawn on a surface, and thus the boundary of the area can generally not be visually recognized. However, in the case where the mobile body is a vacuum cleaner and the mobile body moves into areas in sequence and cleans each of the areas from corner to corner, it is possible to visually recognize a boundary of the area by observing a trajectory of the mobile body.

Figure 31:
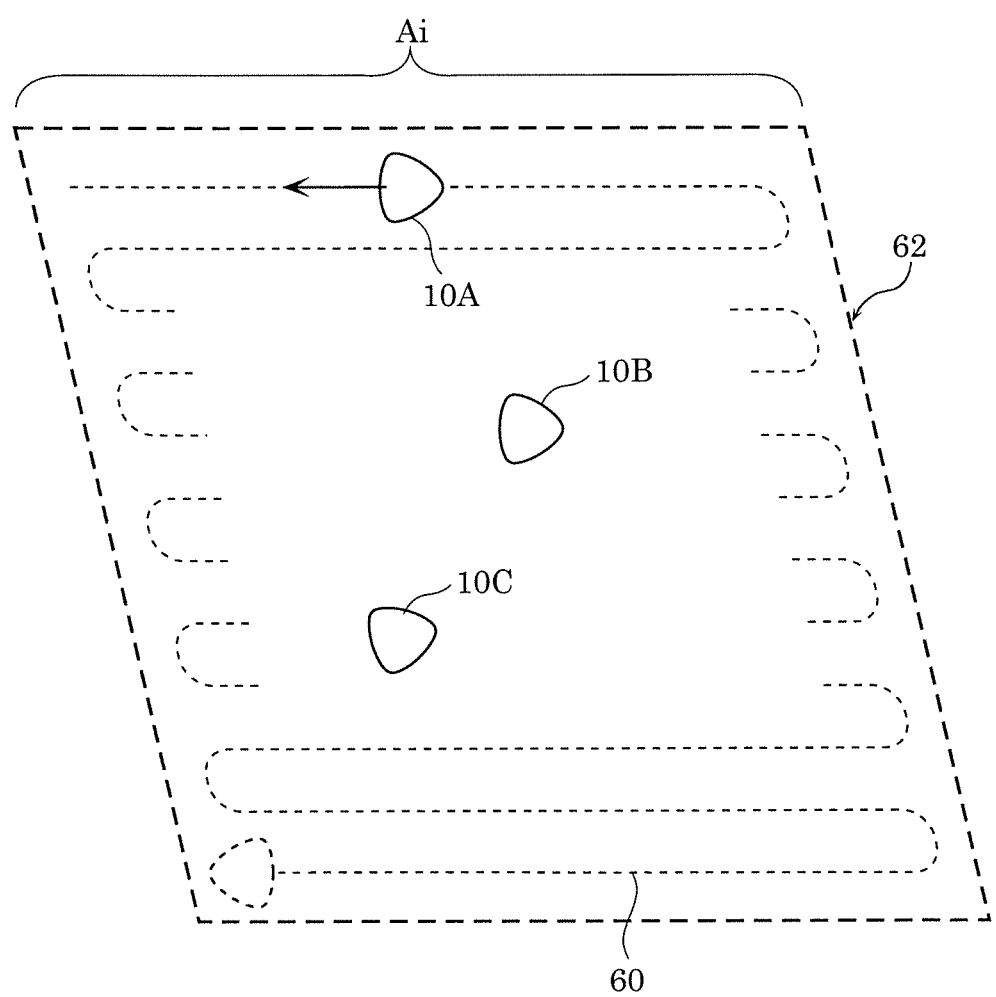
FIG. 31 is an explanatory diagram illustrating the boundary of an area that can be visually recognized on the basis of a trajectory of a mobile body according to an embodiment.

FIG. 31 is an explanatory diagram illustrating the boundary of an area that can be visually recognized on the basis of a trajectory of a mobile body according to the present embodiment. In FIG. 31, trajectory 60 of mobile body 10A moving to clean area Ai from corner to corner is illustrated. For example, if it is possible to obtain trajectory 60 by capturing moving images of mobile body 10A that is moving, an observer can draw graphic 62 enclosing trajectory 60 to obtain a shape similar to area Ai.

Note that in the present embodiment, mobile body 10A and the like include a LiDAR as a premise, but mobile body 10A and the like do not always need to include the LiDAR.

Variation 1 of Embodiment

Figure 32:
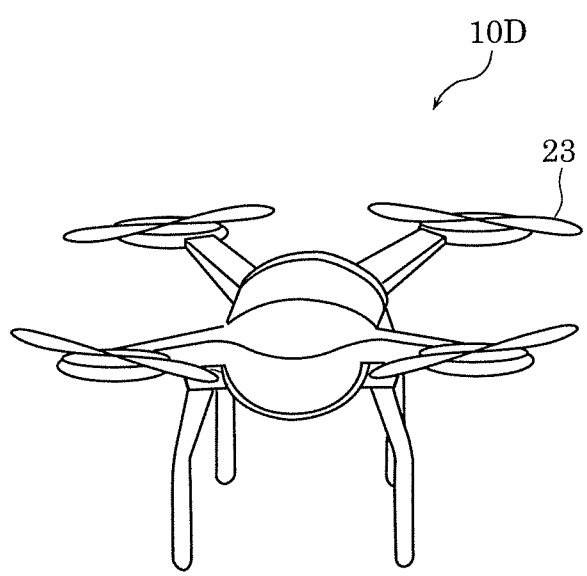
FIG. 32 is an explanatory diagram illustrating one example of a mobile body according to a variation of an embodiment.

FIG. 32 is an explanatory diagram illustrating one example of a mobile body according to a variation of present embodiment.

Mobile body 10D illustrated in FIG. 32 is an unmanned air vehicle capable of moving in a space or what is called a drone.

Mobile body 10D includes, for example, a motor and a propeller as mobile portion 23, and mobile body 10D performs a flying operation by causing the motor to rotate. Note that the motor can be replaced by an engine.

In the case where the mobile body is capable of moving three-dimensionally, the area in the above embodiment is a three-dimensional space. The map information is information of a three-dimensional map.

Furthermore, the mobile body requires, in order to estimate the position of this mobile body itself, at least the positions of three reference mobile bodies and the distances between this mobile body itself and the three reference mobile bodies. Therefore, a mobile body system according to the present variation includes at least four mobile bodies including three reference mobile bodies. The operations and processes in the mobile body system are the same as or similar to those in the above embodiment. As a method for estimating the position of this mobile body itself from the positions of the three reference mobile bodies and the distances between this mobile body itself and the three reference mobile bodies, that is, a method in which three reference positions corresponding to Expression 8 to Expression 11 in the above embodiment are used, a known method can be used; thus, detailed description will be omitted.

Specifically, the mobile body system according to the present embodiment includes at least four mobile bodies capable of moving in a space. At least the four mobile bodies included in the mobile body system are located in the first area. At this time, each of three mobile bodies among at least the four mobile bodies functions as a reference mobile body which is temporarily not in motion, under control of controller 22, in a position within a first distance over which distance measurement by distance measuring sensor 12 is possible from an arbitrary position in the first area. A mobile body different from the above three mobile bodies among at least the four mobile bodies functions as a steerable mobile body which moves in the first area under control of controller 22 using the position of said mobile body that is estimated on the basis of the distance between said mobile body and each of the reference mobile bodies that has been measured by distance measuring sensor 12 of said mobile body.

Furthermore, the following operations are performed when at least four mobile bodies move from the first area into the second area.

(a) The steerable mobile body moves into a boundary area between the first area and the second area and temporarily stops under control of controller 22 according to measurement of distances to three reference mobile bodies.

(b) The reference mobile bodies sequentially move into the boundary area and temporarily stop under control of controller 22 using three reference mobile bodies or the steerable mobile body temporarily not in motion.

(c) Each of three mobile bodies among at least the three mobile bodies functions as a new reference mobile body as a result of moving to a position within the first distance from an arbitrary position in the second area and temporarily stopping under control of controller 22.

(d) A mobile body different from the new reference mobile bodies among at least the four mobile bodies functions as a new steerable mobile body which moves in the second area under control of controller 22 using the position of said mobile body that is estimated on the basis of the distance between said mobile body and each of the new reference mobile bodies that has been measured by distance measuring sensor 12 of said mobile body.

Note that the reference mobile body is referred to also as the first mobile body, the second mobile body, and the third mobile body, and the steerable mobile body is referred to also as the fourth mobile body.

With this, even in the case where there is no object such as a wall at a distance over which distance measurement is possible from the mobile body in the space, the mobile body is capable of executing a task while obtaining the position of this mobile body itself through estimation.

Variation 2 of Embodiment

In the above embodiment, the configuration in which control circuit 19 includes controller 22 is described (refer to FIG. 4), but controller 22 may be located outside mobile body 10. In this case, control circuit 19 includes a communication circuit, and the communication circuit transmits and receives communication signals via communication with controller 22 to control movement of mobile body 10 in the same way as does controller 22 in the above embodiment. Note that the position of controller 22 is not limited as long as controller 22 in the position is capable of communication with mobile body 10 via a network; controller 22 may be located on a server in a network, in other words, what is called a cloud server.

As described above, the mobile body system according to each of the above embodiment and the above variations estimates the position of this mobile body system itself using the reference mobile bodies in the case where estimation of the position of this mobile body system itself is not possible for a reason such as absence of an object such as a wall around the steerable mobile body when the mobile body system moves along a surface. In the case where the mobile body system moves from the first area into the second area, three mobile bodies move into the boundary area once and then move into the second area, making it possible to avoid a failure in estimating the position of this mobile body system itself using the steerable mobile body. This allows the steerable mobile body to move from the first area into the second area while continuously estimating the position of this steerable mobile body itself, and repeating this operation results in passing through a plurality of areas. In this manner, the mobile body can move in a more appropriate travel path.

Furthermore, it is possible to replace the mobile body functioning as the steerable mobile body in the mobile body system. This produces an advantageous effect of leveling out electric power consumption of the plurality of mobile bodies, leading to an advantageous effect of enabling the mobile body system to operate for a longer length of time as a whole.

Furthermore, by using an area in the shape of a parallelogram, it is possible to more easily set a plurality of areas in a region in which the mobile body is capable of moving.

Furthermore, during movement of the steerable mobile body in the mobile body system, it is possible to keep the presence of the reference mobile bodies from becoming restriction or impedance to the movement of the steerable mobile body.

Furthermore, in the mobile body system, it is possible to avoid the occurrence of a fault in execution of the task by the steerable mobile body that is due to, for example, displacement of a carpet along with movement of the steerable mobile body.

Furthermore, the mobile body system estimates the position of this mobile body system itself using the reference mobile bodies in the case where estimation of the position of this mobile body system itself is not possible for a reason such as absence of an object such as a wall around the steerable mobile body when the mobile body system moves in a space. In the case where the mobile body system moves from the first area into the second area, four mobile bodies move into the boundary area once and then move into the second area, making it possible to avoid a failure in estimating the position of this mobile body system itself using the steerable mobile body. This allows the steerable mobile body to move from the first area into the second area while continuously estimating the position of this steerable mobile body itself, and repeating this operation results in passing through a plurality of areas. In this manner, the mobile body can move in a more appropriate travel path.

Note that in the above embodiment and variations, each structural element may be configured using dedicated hardware or may be implemented by executing a software program appropriate for the structural element. Each structural element may be implemented as a result of a program execution unit such as a central processing unit (CPU) or a processor reading and executing a software program recorded on a storage medium such as a hard disk or a semiconductor memory. Here, the software program for implementing the mobile body system according to the above embodiment and variations is the program described below.

Specifically, this program causes a computer to perform a method for controlling a mobile body system including at least three mobile bodies which move in a space and each of which includes: a storage in which map information of the space is stored, the space including a first area, a second area, and a boundary area in which the first area and the second area overlap; a distance measuring sensor; a mobile portion which moves the mobile body; and a controller which controls movement of the mobile body by the mobile portion, using the map information stored in the storage and a position of the mobile body estimated based on distance information obtained by the distance measuring sensor. The at least three mobile bodies include a first mobile body, a second mobile body, and a third mobile body. The method includes: (i) upon movement of the at least three mobile bodies in the first area, causing each of the first mobile body and the second mobile body to temporarily stop at a position within a first distance over which distance measurement by the distance measuring sensor is possible from an arbitrary position in the first area, and causing the third mobile body to move using a position of the third mobile body estimated based on a distance between the third mobile body and the first mobile body and a distance between the third mobile body and the second mobile body which are measured by the distance measuring sensor that is included in the third mobile body; and (ii) upon movement of the at least three mobile bodies from the first area into the second area, (a) causing the third mobile body to move into the boundary area and temporarily stop using the distance between the third mobile body and the first mobile body and the distance between the third mobile body and the second mobile body, (b) after the third mobile body moves into the boundary area, causing the first mobile body to move into the boundary area and temporarily stop using a distance between the first mobile body and the second mobile body and the distance between the first mobile body and the third mobile body, and (c) after the third mobile body moves into the boundary area, causing the second mobile body to move into the boundary area and temporarily stop using the distance between the second mobile body and the first mobile body and the distance between the second mobile body and the third mobile body.

Although the mobile body system, etc., according to one or more aspects have been described thus far based on the embodiment, the present disclosure is not limited to the above embodiment. Various modifications of the above embodiment as well as embodiments resulting from combinations of structural elements in different exemplary embodiments that may be conceived by a person having ordinary skill in the art are intended to be included within the scope of one or more aspects as long as these do not depart from the essence of the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a mobile body system in which a mobile body moves in a more appropriate travel path. Specifically, the present disclosure is applicable to a vacuum cleaner, a moving robot, a delivery robot, a communication robot, an unmanned aerial vehicle (drone), and the like.

What is claimed is:

1. A mobile body system, comprising:
at least three mobile bodies which move in a space, each of the at least three mobile bodies including:
a storage in which map information of the space is stored, the space including a first area, a second area, and a boundary area in which the first area and the second area overlap;
a distance measuring sensor;
a mobile portion which moves the mobile body; and
a controller which controls movement of the mobile body by the mobile portion, using the map information stored in the storage and a position of the mobile body estimated based on distance information obtained by the distance measuring sensor, wherein
the at least three mobile bodies include a first mobile body, a second mobile body, and a third mobile body,
(i) upon movement of the at least three mobile bodies in the first area,
each of the first mobile body and the second mobile body temporarily stops at a position within a first distance over which distance measurement by the distance measuring sensor is possible from an arbitrary position in the first area, and
the third mobile body moves using a position of the third mobile body estimated based on a distance between the third mobile body and the first mobile body and a distance between the third mobile body and the second mobile body which are measured by the distance measuring sensor that is included in the third mobile body, and
(ii) upon movement of the at least three mobile bodies from the first area into the second area,
(a) the third mobile body moves into the boundary area and temporarily stops using the distance between the third mobile body and the first mobile body and the distance between the third mobile body and the second mobile body,
(b) after the third mobile body moves into the boundary area, the first mobile body moves into the boundary area and temporarily stops using a distance between the first mobile body and the second mobile body and the distance between the first mobile body and the third mobile body, and
(c) after the third mobile body moves into the boundary area, the second mobile body moves into the boundary area and temporarily stops using the distance between the second mobile body and the first mobile body and the distance between the second mobile body and the third mobile body.

2. The mobile body system according to claim 1, wherein
(iii) upon movement of the at least three mobile bodies in the second area after the movement from the first area into the second area,
each of the first mobile body and the second mobile body moves to a position within the first distance from an arbitrary position in the second area and temporarily stops, and
the third mobile body moves using a position of the third mobile body estimated based on the distance between the third mobile body and the first mobile body and the distance between the third mobile body and the second mobile body which are measured by the distance measuring sensor that is included in the third mobile body.

3. The mobile body system according to claim 1, wherein
(iii) upon movement of the at least three mobile bodies in the second area after the movement from the first area into the second area,
each of the second mobile body and the third mobile body moves to a position within the first distance from an arbitrary position in the second area and temporarily stops, and
the first mobile body moves using a position of the first mobile body estimated based on the distance between the first mobile body and the second mobile body and the distance between the first mobile body and the third mobile body which are measured by the distance measuring sensor that is included in the first mobile body.

4. The mobile body system according to claim 1, wherein
the space includes a plurality of areas including the first area and the second area,
each of the plurality of areas is in a shape of a parallelogram,
among four vertices of the parallelogram, two opposite vertices are two intersections of two circles centered on two points within the first distance from an arbitrary position in the area, and
the parallelogram is inscribed in an overlap region of the two circles.

5. The mobile body system according to claim 1, wherein
the space includes a plurality of areas including the first area and the second area, and
in each of the plurality of areas,
two points within the first distance from an arbitrary position in the area are on a side that is an edge of the area.

6. The mobile body system according to claim 2, wherein
the second area is a region including a carpet disposed on a fixed surface, and the first area is the fixed surface on which the carpet is not located, and
the second mobile body and the third mobile body are positioned to press the carpet against the fixed surface.

7. The mobile body system according to claim 6, wherein
the first mobile body moves in the second area so as to pass over a straight line connecting the second mobile body and the third mobile body.

8. A mobile body system, comprising:
at least four mobile bodies which move in a space, each of the at least four mobile bodies including:
a storage in which map information of the space is stored, the space including a first area, a second area, and a boundary area in which the first area and the second area overlap;
a distance measuring sensor;
a mobile portion which moves the mobile body; and
a controller which controls movement of the mobile body by the mobile portion, using the map information stored in the storage and a position of the mobile body estimated based on distance information obtained by the distance measuring sensor, wherein
the at least four mobile bodies include a first mobile body, a second mobile body, a third mobile body, and a fourth mobile body,
(i) upon movement of the at least four mobile bodies in the first area,
each of the first mobile body, the second mobile body, and the third mobile body temporarily stops at a position within a first distance over which distance measurement by the distance measuring sensor is possible from an arbitrary position in the first area, and the fourth mobile body moves using a position of the fourth mobile body estimated based on a distance between the fourth mobile body and the first mobile body, a distance between the fourth mobile body and the second mobile body, and a distance between the fourth mobile body and the third mobile body which are measured by the distance measuring sensor that is included in the fourth mobile body, and (ii) upon movement of the at least four mobile bodies from the first area into the second area, (a) the fourth mobile body moves into the boundary area and temporarily stops using the distance between the fourth mobile body and the first mobile body, the distance between the fourth mobile body and the second mobile body, and the distance between the fourth mobile body and the third mobile body, (b) after the fourth mobile body moves into the boundary area, the first mobile body moves into the boundary area and temporarily stops using a distance between the first mobile body and the second mobile body, a distance between the first mobile body and the third mobile body, and the distance between the first mobile body and the fourth mobile body, (c) after the fourth mobile body moves into the boundary area, the second mobile body moves into the boundary area and temporarily stops using the distance between the second mobile body and the first mobile body, a distance between the second mobile body and the third mobile body, and the distance between the second mobile body and the fourth mobile body, and (d) after the fourth mobile body moves into the boundary area, the third mobile body moves into the boundary area and temporarily stops using the distance between the third mobile body and the first mobile body, the distance between the third mobile body and the second mobile body, and the distance between the third mobile body and the fourth mobile body.

9. A method for controlling a mobile body system including at least three mobile bodies which move in a space, each of the at least three mobile bodies including:

a storage in which map information of the space is stored, the space including a first area, a second area, and a boundary area in which the first area and the second area overlap;

a distance measuring sensor;

a mobile portion which moves the mobile body; and a controller which controls movement of the mobile body by the mobile portion, using the map information stored in the storage and a position of the mobile body estimated based on distance information obtained by the distance measuring sensor, wherein the at least three mobile bodies include a first mobile body, a second mobile body, and a third mobile body, and the method comprises:

(i) upon movement of the at least three mobile bodies in the first area, causing each of the first mobile body and the second mobile body to temporarily stop at a position within a first distance over which distance measurement by the distance measuring sensor is possible from an arbitrary position in the first area, and causing the third mobile body to move using a position of the third mobile body estimated based on a distance between the third mobile body and the first mobile body and a distance between the third mobile body and the second mobile body which are measured by the distance measuring sensor that is included in the third mobile body; and (ii) upon movement of the at least three mobile bodies from the first area into the second area, (a) causing the third mobile body to move into the boundary area and temporarily stop using the distance between the third mobile body and the first mobile body and the distance between the third mobile body and the second mobile body, (b) after the third mobile body moves into the boundary area, causing the first mobile body to move into the boundary area and temporarily stop using a distance between the first mobile body and the second mobile body and the distance between the first mobile body and the third mobile body, and (c) after the third mobile body moves into the boundary area, causing the second mobile body to move into the boundary area and temporarily stop using the distance between the second mobile body and the first mobile body and the distance between the second mobile body and the third mobile body.

* * * * *